United States Patent
Ito et al.

(10) Patent No.: US 6,453,071 B2
(45) Date of Patent: Sep. 17, 2002

(54) DATA COMMUNICATION APPARATUS, METHOD AND SYSTEM AND PROGRAMS FOR DATA COMMUNICATION PROCESS STORED IN COMPUTER READABLE STORAGE MEDIUM

(75) Inventors: Masamichi Ito, Machida; Susumu Kozuki, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/053,748

(22) Filed: Apr. 2, 1998

(30) Foreign Application Priority Data

Apr. 4, 1997 (JP) .............................. 9-102582
Apr. 10, 1997 (JP) .............................. 9-092195

(51) Int. Cl.[7] .................................. G06K 9/36
(52) U.S. Cl. ...................... 382/232; 382/233
(58) Field of Search ................... 370/329, 330, 370/524, 525, 395, 397, 495, 496, 241–253, 282, 298, 526; 395/200; 382/232, 233, 235; 358/1.1, 1.2, 1.16, 1.15, 1.18, 400, 401, 426.01, 426.02, 437, 1.14

(56) References Cited

U.S. PATENT DOCUMENTS

| | | | | |
|---|---|---|---|---|
| 5,297,147 A | * | 3/1994 | Shimokasa | 370/118 |
| 5,533,018 A | * | 7/1996 | Dejager et al. | 370/60 |
| 5,544,315 A | * | 8/1996 | Lehfeldt et al. | 395/200 |
| 5,594,734 A | * | 1/1997 | Worsley et al. | 370/395 |
| 5,659,542 A | * | 8/1997 | Bell et al. | 370/496 |
| 5,953,350 A | * | 9/1999 | Higgins | 370/524 |
| 6,011,784 A | * | 1/2000 | Brown et al. | 370/329 |

* cited by examiner

Primary Examiner—Phuoc Tran
Assistant Examiner—Amir Alavi
(74) Attorney, Agent, or Firm—Fitzpatrick, Cella, Harper & Scinto

(57) ABSTRACT

In a data communication apparatus for encoding information data by using a predetermined encoding method, encoded information data is transmitted isochronously with a predetermined communication cycle when the encoding method corresponds to a decoding method at an object node apparatus and non-encoded information data is transmitted asynchronously with the communication cycle when the encoding method does not correspond to the decoding method at the object node apparatus. It is therefore possible to perform an encoding process for the information data to be transmitted, in accordance with a decoding performance at the object node apparatus, to improve a communication efficiency, and to reduce a capacity of a memory used for communications.

12 Claims, 26 Drawing Sheets

DATA COMMUNICATION APPARATUS, METHOD AND SYSTEM AND PROGRAMS FOR DATA COMMUNICATION PROCESS STORED IN COMPUTER READABLE STORAGE MEDIUM

BACKGROUND OF THE INVENTION

1. Field of the Invention

The present invention relates to a data communication apparatus, method and system, and to programs for a data communication process stored in a computer readable storage medium. More particularly, the invention relates to data communication techniques using communication control buses capable of dealing with mixed control and data signals.

2. Related Background Art

A need for using an apparatus dealing with still or moving images, such as AV (audio visual) apparatuses, as a peripheral apparatus of a personal computer has recently become strong. The AV apparatuses include a digital video tape recorder (D-VTR), a digital video tape recorder with a built-in camera (D-CAM), a digital camera, and the like. For such needs, a system has been developed which can connect such AV apparatuses to PC and can process and edit in various ways digital signals of still and moving images taken with AV apparatuses. Another system has also been developed in which PC can record still and moving image signals from AV apparatuses in a recording medium such as a hard disk, and can print such images with an image printing apparatus such as a printer.

In order to reduce the amount of still and moving image data to be transferred between apparatuses constituting such a system, the image data is converted into compressed data by using various compression encoding techniques. For example, a JPEG (Joint Photographic Experts Group) method is known for still images, and an MPEG (Moving Picture Experts Group) method is known for moving images. These compression encoding methods are realized by a combination of DCT techniques and variable length coding techniques, while taking into consideration the characteristics and features of image data to be compressed.

FIG. 1 is a block diagram showing the structure of a conventional communication system. In FIG. 1, reference numeral 101 represents a D-CAM (recording/reproducing device), 102 represents a printer, and 103 represents a PC. PC 103 and the printer 102 are interconnected by communication interfaces of SCSI (small computer system interface) specifications. PC 103 and D-CAM 101 are interconnected by dedicated communication interfaces.

In the communication system shown in FIG. 1, for example, the following processes have been executed in printing a still image contained in moving images reproduced with D-CAM 101.

PC 103 temporarily stores moving image data sequentially output from D-CAM 101 in a storage device such as a hard disk. Next, PC 103 reproduces the moving images by using a predetermined application, and selects a desired still image of one frame from the moving images. In this case, a user performs a special effect process for the selected still image, if necessary, and thereafter instructs to print the still image. In response to this instruction, PC 103 supplies the still image data to the printer 102 connected thereto via a communication interface different from that for D-CAM 101. Lastly, the printer 102 prints out the still image. As above, the communication system shown in FIG. 1 prints a still image contained in moving images with the help of PC 102.

With the communication system described above, however, in order to select a desired still image contained in moving images produced with D-CAM 101, the moving image is required to be temporarily stored in the storage device such as a hard disk of PC 103. PC 103 then reproduces moving image data stored in the storage device to select a desired still image.

In the conventional communication system, therefore, a large amount of data such as moving image data is sequentially sent to PC 103 each time in the unit of a predetermined amount of data, so that a load of PC 103 is very large. Depending upon the process performance and condition of PC 103 itself or upon a communication state of each apparatus, PC 103 may become inoperative or adversely affect the communication with other apparatuses. Furthermore, since a desired still image is selected after the moving image data stored in PC 103 is reproduced, it takes a long time to print the still image.

In the communication system shown in FIG. 1, in order to reduce the amount of moving image data to be transmitted from D-CAM 101 to PC 103, the moving image data is compressed at D-CAM 101 by a predetermined compression encoding scheme, and the compressed data is transmitted to PC 103.

However, even if D-CAM 101 transmits compressed moving image data, a desired still image cannot be selected unless PC 103 itself can expand and decode the compressed moving image data.

In the communication system shown in FIG. 1, if moving image data irrelevant to the compression coding scheme used by PC 103 is to be transmitted, D-CAM 101 has conventionally transmitted non-compressed moving data itself to PC 103.

However, if PC 103 has an expansion decoding scheme corresponding to the compression encoding scheme of D-CAM 101, a transmission efficiency is lowered unnecessarily and a load on PC 103 is increased.

SUMMARY OF THE INVENTION

An object of the present invention is to solve the above-described problems.

Another object of the invention is to provide a data communication apparatus in which an encoding process for information data to be transmitted is performed in accordance with a decoding performance at an object node apparatus, to thereby improve the communication efficiency and reduce a capacity of a memory used for communications.

As a preferred embodiment for such objects, the invention discloses a data communication apparatus which comprises: (a) communication means having a first mode of transmitting information data isochronously with a predetermined communication cycle and a second mode of transmitting information data asynchronously with the predetermined communication cycle; (b) encoding means for encoding the information data by a predetermined encoding method; and (c) control means for controlling the communication means so as to transmit encoded information data when the encoding method corresponds to a decoding method at an object node apparatus and to transmit non-encoded information data when the encoding method does not correspond to the decoding method at the object node apparatus.

As another embodiment, the invention discloses a data communication apparatus which comprises: (a) communication means having a first mode of communication isochronous with a predetermined communication cycle and a second mode of communication asynchronous with the communication cycle; (b) encoding means for encoding image information in accordance with a decoding performance at an object node apparatus, the image information including moving image information and still image information; and (c) control means for controlling the communication means so as to transmit the moving image information by using the first mode and to transmit the still image information by using the second mode.

As another embodiment, the invention discloses a data communication apparatus which comprises: (a) input means for inputting moving image information and still image information; (b) encoding means for encoding the moving image information and the still image information; and (c) transmitting means for transmitting the moving image to a number of unidentified apparatuses and transmitting the still image information to a designated apparatus.

As another embodiment, the invention discloses a data communication apparatus which comprises: (a) input means for inputting information data; (b) encoding means for encoding the information data; and (c) transmitting means for transmitting decode information containing program codes realizing the decoding method corresponding to an encoding method to be used by the encoding means and transmitting the information data encoded by the encoding means.

As another embodiment, the invention discloses a data communication apparatus which comprises: (a) input means for inputting encoded information data and decode information realizing a decoding process for the information data; and (b) decoding means for decoding the encoded information data by using the decode information.

As another embodiment, the invention discloses a data communication apparatus which comprises: (a) encoding means for encoding information data by using a predetermined encoding method; (b) decoding means for decoding information data encoded by the encoding means; and (c) selecting means for selecting an output of either the encoding means or the decoding means in accordance with whether the encoding method corresponds to a decoding method at an object node apparatus.

Another object of the present invention is to provide a data communication method in which an encoding process for information data to be transmitted is performed in accordance with a decoding performance at an object node apparatus, to thereby improve the communication efficiency and reduce a capacity of a memory used for communications.

As a preferred embodiment for such an object, the invention discloses a data communication method which comprises the steps of: (a) encoding information data by a predetermined encoding method; (b) transmitting encoded information data isochronously with a predetermined communication cycle when the encoding method corresponds to a decoding method at an object node apparatus; and (c) transmitting non-encoded information data asynchronously with the communication cycle when the encoding method does not correspond to the decoding method at the object node apparatus.

As another embodiment, the invention discloses a data communication method which comprises the steps of: (a) encoding image information in accordance with a decoding performance at an object node apparatus, the image information including moving image information and still image information; (b) transmitting the moving image information by using a communication scheme isochronous with a predetermined communication cycle; and (c) transmitting the still image by the communication scheme isochronous with the communication cycle or by a communication scheme asynchronous with the communication cycle.

As another embodiment, the invention discloses a data communication method which comprises the steps of: (a) inputting moving image information and still image information; (b) encoding the moving image information and the still image information; and (c) transmitting the moving image to a number of unidentified apparatuses and transmitting the still image information to a designated apparatus.

As another embodiment, the invention discloses a data communication method which comprises the steps of: (a) inputting information data; (b) encoding the information data; and (c) transmitting decode information containing program codes realizing the decoding method corresponding to an encoding method to be used at the encoding step and transmitting the information data encoded at the encoding step.

As another embodiment, the invention discloses a data communication method which comprises the steps of: (a) inputting encoded information data and decode information realizing a decoding process for the information data; and (b) decoding the encoded information data by using the decode information.

As another embodiment, the invention discloses a data communication method which comprises the steps of: (a) encoding information data by using a predetermined encoding scheme; (b) decoding information data encoded at the encoding step; and (c) selecting an output of either the encoded information data or the decoded information data in accordance with whether the encoding scheme corresponds to a decoding scheme at an object node apparatus.

Another object of the present invention is to provide a data communication system in which an encoding process for information data to be transmitted is performed in accordance with a decoding performance at an object node apparatus, to thereby improve the communication efficiency and reduce a capacity of a memory used for communications.

As a preferred embodiment for such an object, the invention discloses a data communication system having a first mode of transmitting information data isochronously with a predetermined communication cycle and a second mode of transmitting information data asynchronously with the predetermined communication cycle, wherein encoded information data is transmitted when a predetermined encoding scheme corresponds to a decoding scheme at an object node apparatus and non-encoded information data is transmitted when the encoding scheme does not correspond to the decoding scheme at the object node apparatus.

As another embodiment, the invention discloses a data communication system having a first mode of communication isochronous with a predetermined communication cycle and a second mode of communication asynchronous with the communication cycle, wherein moving image information encoded in accordance with a decoding performance at an object node apparatus is transmitted by using the first mode and still image information encoded in accordance with the decoding performance at the object node apparatus is transmitted by using the first or second mode.

As another embodiment, the invention discloses a data communication system, comprising: (a) a transmission apparatus for transmitting decode information containing program codes realizing a decoding method corresponding to a predetermined encoding method and transmitting information data encoded by using the encoding method; and (b) a reception apparatus for receiving the decode information and the information data and decoding the information data by using the decode information.

Another object of the present invention is to provide a program for a data communication process stored in a computer readable storage medium, in which an encoding process for information data to be transmitted is performed in accordance with a decoding performance at an object node apparatus, to thereby improve the communication efficiency and reduce a capacity of a memory used for communications.

As a preferred embodiment for such an object, the invention discloses a program for a data communication process stored in a computer readable storage medium, comprising the steps of: (a) encoding information data by a predetermined encoding method; (b) transmitting encoded information data isochronously with a predetermined communication cycle when the encoding method corresponds to a decoding method at an object node apparatus; and (c) transmitting non-encoded information data asynchronously with the communication cycle when the encoding method does not correspond to the decoding method at the object node apparatus.

As another embodiment, the invention discloses a program for a data communication process stored in a computer readable storage medium, comprising the steps of: (a) encoding image information in accordance with a decoding performance at an object node apparatus, the image information including moving image information and still image information; (b) transmitting the moving image information by using a communication scheme isochronous with a predetermined communication cycle; and (c) transmitting the still image by the communication scheme isochronous with the communication cycle or by a communication scheme asynchronous with the communication cycle.

As another embodiment, the invention discloses a program for a data communication process stored in a computer readable storage medium, comprising the steps of: (a) inputting moving image information and still image information; (b) encoding the moving image information and the still image information; and (c) transmitting the moving image to a number of unidentified apparatuses and transmitting the still image information to a designated apparatus.

As another embodiment, the invention discloses a program for a data communication process stored in a computer readable storage medium, comprising the steps of: (a) inputting information data; (b) encoding the information data; and (c) transmitting decode information containing program codes realizing the decoding method corresponding to an encoding method to be used at the encoding step and transmitting the information data encoded at the encoding step.

As another embodiment, the invention discloses a program for a data communication process stored in a computer readable storage medium, comprising the steps of: (a) inputting encoded information data and decode information realizing a decoding process for the information data; and (b) decoding the encoded information data by using the decode information.

As another embodiment, the invention discloses a program for a data communication process stored in a computer readable storage medium, comprising the steps of: (a) encoding information data by using a predetermined encoding scheme; (b) decoding information data encoded at the encoding step; and (c) selecting an output of either the encoded information data or the decoded information data in accordance with whether the encoding scheme corresponds to a decoding scheme at an object node apparatus.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will now be described in detail hereinafter with reference to the accompanying drawings.

1. First Embodiment

Figure 1:
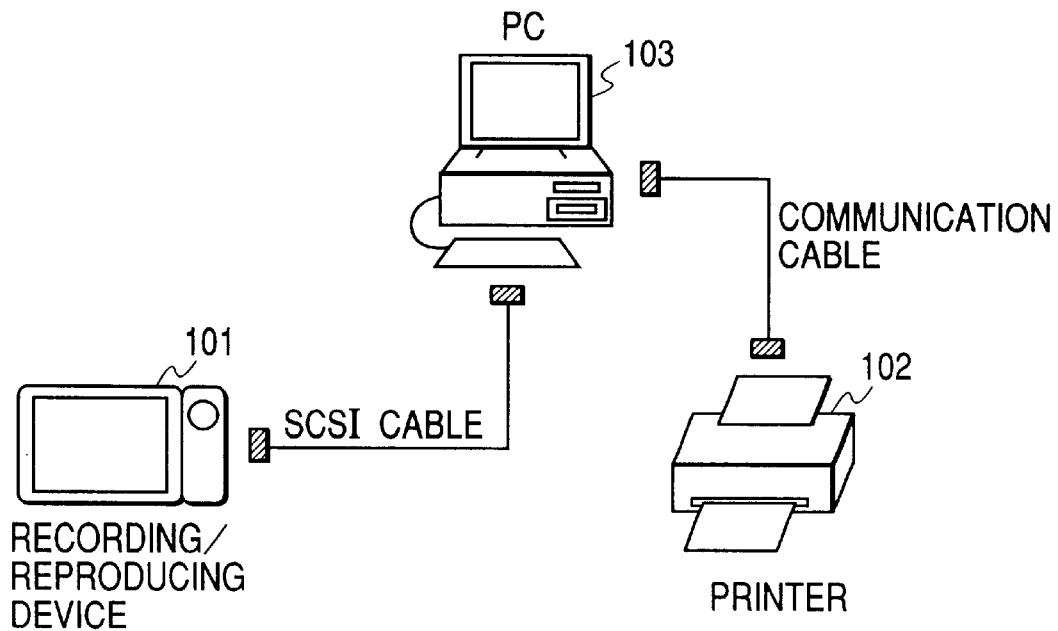
FIG. 1 is a schematic diagram showing the structure of a conventional communication system.
Figure 2:
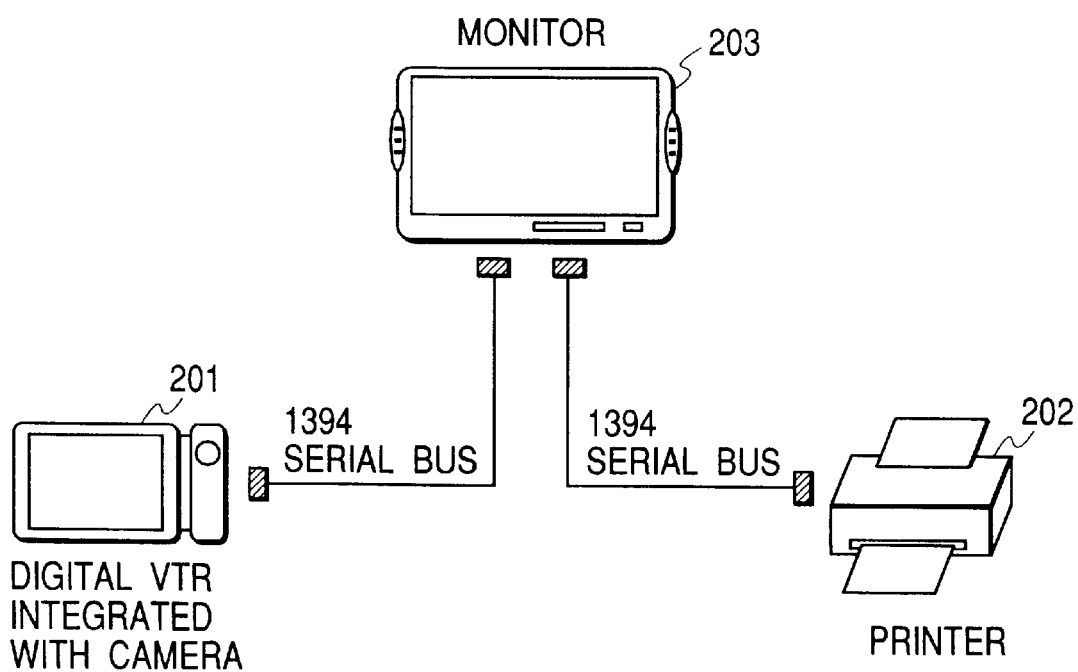
FIG. 2 is a schematic diagram showing the structure of a communication system according to a first embodiment of the invention.

FIG. 2 is a diagram showing a communication system according to a first embodiment of the invention. This communication system can perform communications in conformity with IEEE 1394—1995 specifications (hereinafter called IEEE 1394 specifications).

Apparatuses constituting the communication system shown in FIG. 2 have communication interfaces in conformity with IEEE 1394 specifications (hereinafter called 1394 interfaces). The apparatuses are interconnected by communication cables in conformity with IEEE 1394 specifications.

Technologies of IEEE 1394 specifications will be briefly described. The details of IEEE 1394 specifications are given in "IEEE 1394—1995 Standard for a High Performance Serial Bus" published by IEEE (Institute of Electrical and Electronics Engineers).

<Summary>

Figure 3:
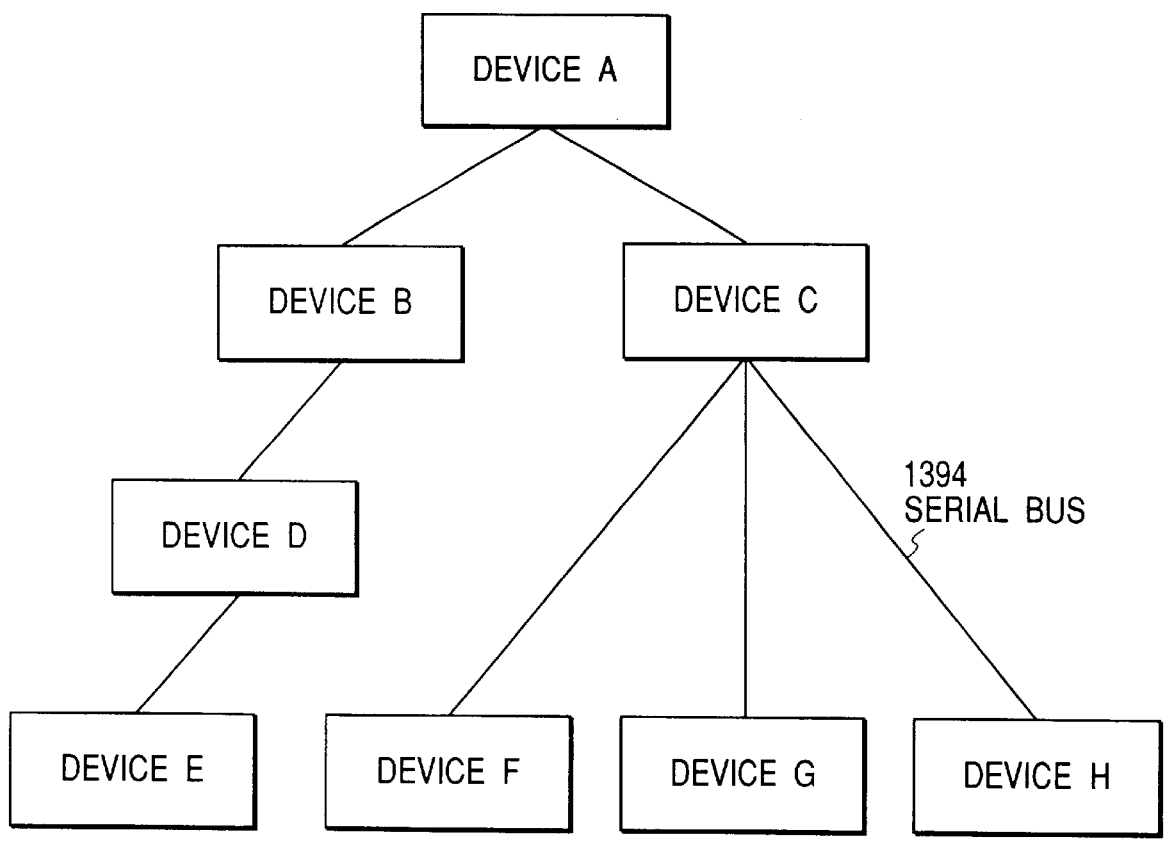
FIG. 3 is a schematic diagram showing an example of a communication system in conformity with IEEE 1394 specifications.

FIG. 3 shows an example of a communication system in conformity with IEEE 1394 specifications. This communication system configures a bus type network capable of serial data communications.

In FIG. 3, apparatuses A to H are interconnected by twist pair cables in conformity with IEEE 1394 specifications. Examples of these apparatuses are a PC (Personal Computer), a digital VTR (Video Tape Recorder), a DVD (Digital Video Disc) player, a digital camera, a hard disk, a monitor and the like.

As the interconnection method for the communication system shown in FIG. 3, daisy chain and node branch are both used so that a high degree of connection freedom is possible.

The communication system shown in FIG. 3 automatically executes a bus reset (a process of resetting the past network configuration and re-recognizing the new network configuration) when any apparatus is disconnected from the network, when a new apparatus is connected to the network, or when the power of an apparatus connected to the network is turned on or off. With this bus reset, the communication system can automatically assign each apparatus with its specific ID, or each apparatus constituting the communication system can automatically recognize the network connection. With these functions, the 1394 network can recognize the network configuration at any time.

The communication system shown in FIG. 3 has a function of relaying data from one apparatus to another, and each apparatus can recognize the bus operation state at the same time. Furthermore, the communication system has a function called Plug & Play so that an apparatus connected to the network or the connection state of the network can be automatically recognized without turning the power of the whole network off.

The communication system shown in FIG. 3 can deal with the data transmission rates of 100/200/400 Mbps. The apparatus having a higher transmission rate supports the apparatus having a lower transmission rate to make them compatible.

The communication system shown in FIG. 3 has two different data transmission modes including an asynchronous transmission mode and an isochronous transmission mode. The asynchronous transmission mode is suitable for transmitting data required to be asynchronously transmitted when necessary (such as control signals and file data). The isochronous transmission mode is suitable for transmitting data required to be transmitted continuously at a predetermined data rate (such as video data and audio data). Both the asynchronous and isochronous transmission modes may be used in each communication cycle (generally 125 $\mu$s). Each transmission mode is executed after a cycle start packet (CSP) indicating the start of a cycle is transmitted. In each communication cycle period, the isochronous transmission mode has a priority order higher than the asynchronous transmission mode. The transmission bandwidth of the isochronous transmission mode is ensured or reserved in each communication cycle.

<Architecture>

Figure 4:
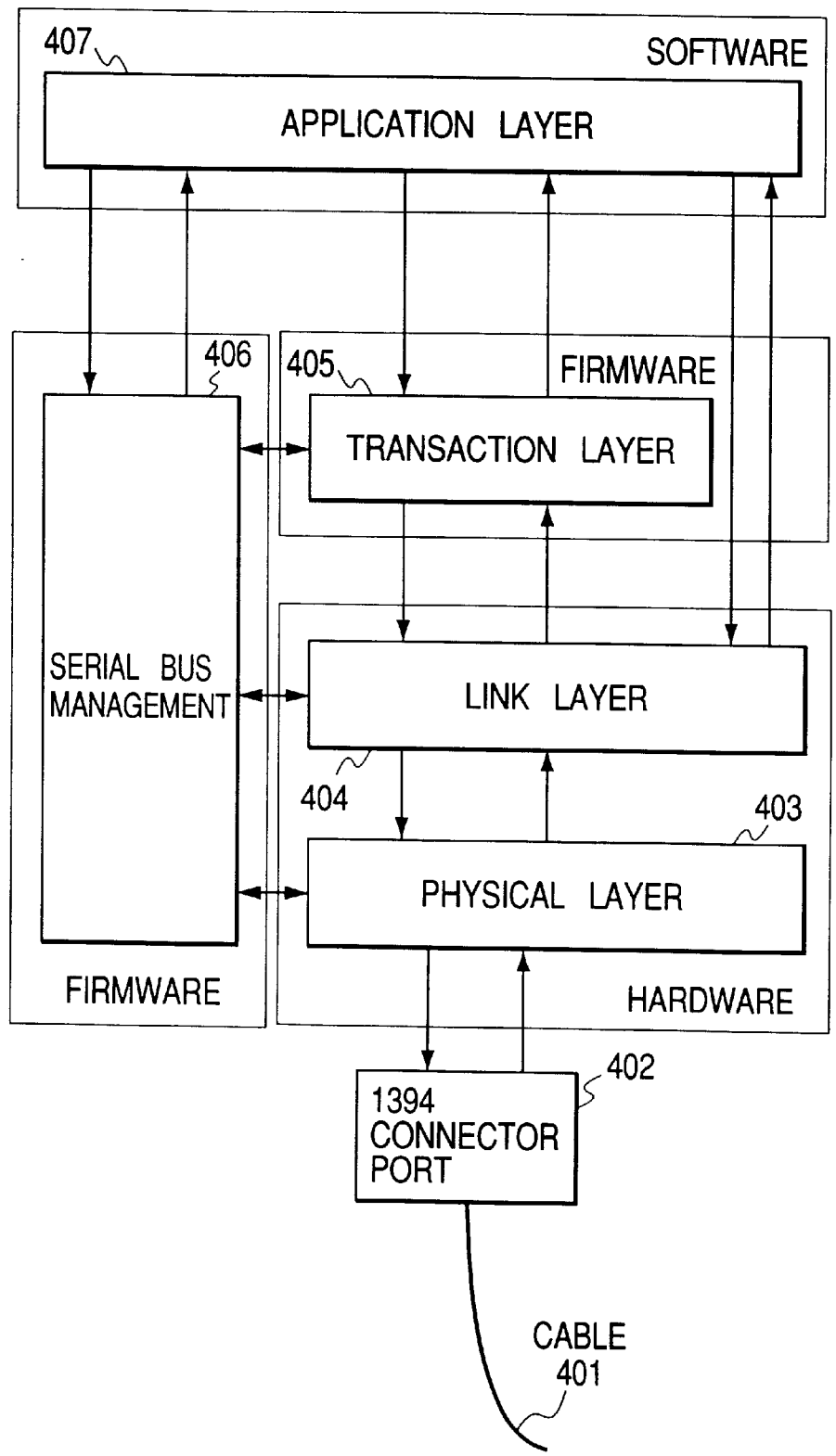
FIG. 4 is a diagram showing constituents of a 1394 interface.

The constituents of an 1394 interface are shown in FIG. 4.

The 1394 interface is functionally configured to have a layer (hierarchical) structure. As shown in FIG. 4, reference numeral 401 represents a communication cable in conformity with IEEE 1394 specifications. This cable 401 is connected via a connector port 402 of the 1394 interface to a physical layer 403 and to a link layer 404 in a hardware portion.

The hardware portion is substantially an interface chip. Of the hardware portion, the physical layer 403 controls a bus reset, encoding/decoding of input/output signals, and the like. The link layer 404 generates a communication packet, controls a cycle timer, and performs other operations.

A transaction layer 405 of a firmware portion performs management of data to be transmitted and manages Read and Write transactions. A serial bus management 406 performs the management of connection state and ID of each apparatus connected to the system to thereby manage the network configuration and information.

These hardware and software are the substantial structure of the 1394 interface.

An application layer 407 shown in FIG. 4 becomes different depending upon software to be used. This layer defines how data is communicated over the communication system. For example, in the case of moving image data of a D-VTR, data communication is defined in accordance with a communication protocol such as an AV/C protocol.

<Address Designation>

Figure 5:
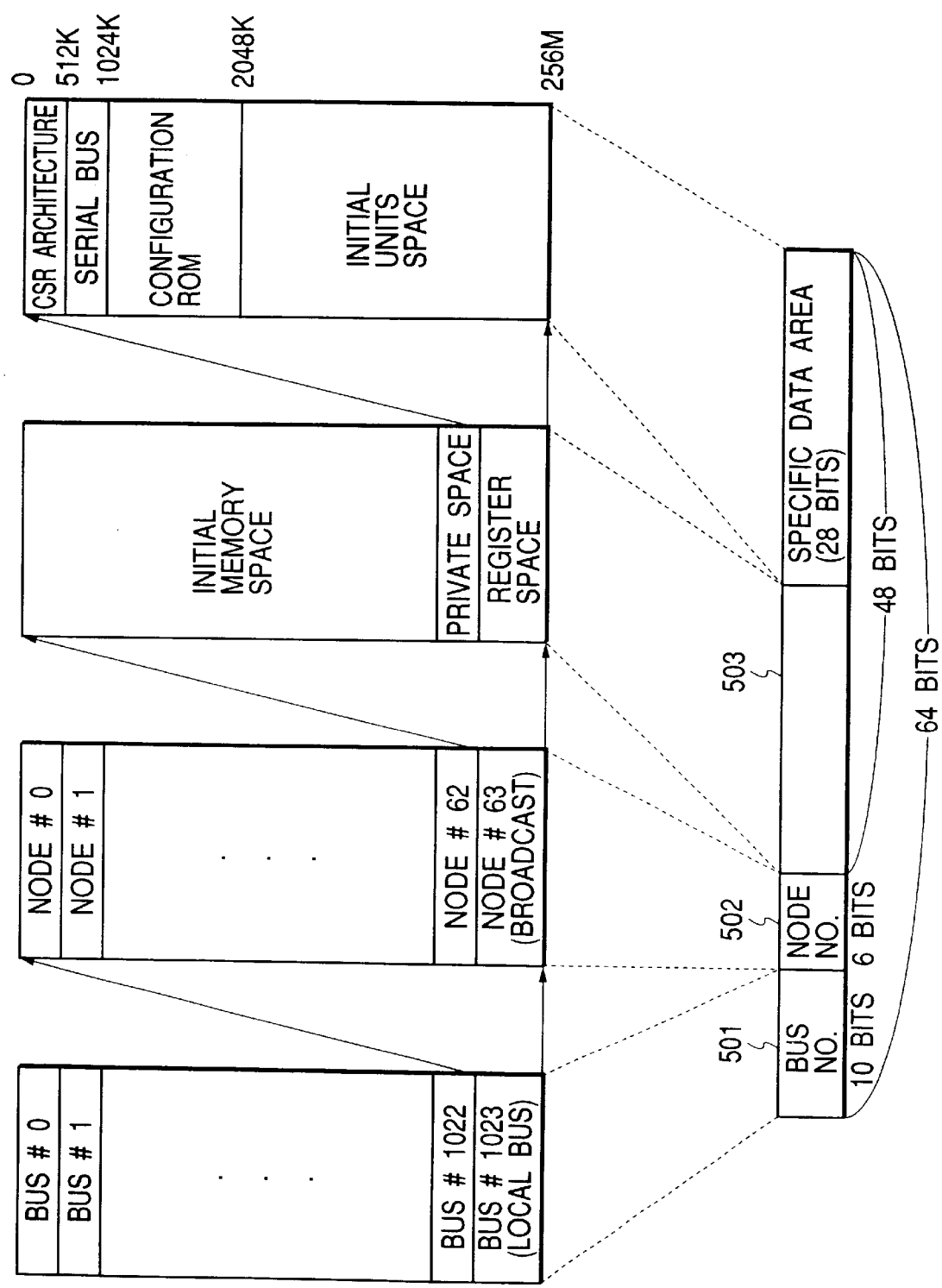
FIG. 5 is a diagram showing the address space of a 1394 interface.

FIG. 5 shows an address space of the 1394 interface.

Addressing of an 1394 interface is in conformity with IEEE 1212 which defines an address space of a 64-bit width. In addressing, the first 10-bit field is used for designating a bus ID number, and the next 6-bit field (502) is used for designating the apparatus (node) ID. These upper 16 bits are used for identifying a node ID and for communications between nodes. The remaining 48-bit field designates an address space assigned to the apparatus. In this field, a 20-bit field (403) designates a plurality areas constituting the address space (i.e., an initial memory space, a private space, a register space). The last 28-bit field (404) designates an address for a specific data area in which information of apparatus discrimination (company name, apparatus type and the like) and use condition is stored.

<Structure of Communication Cable>

Figure 6:
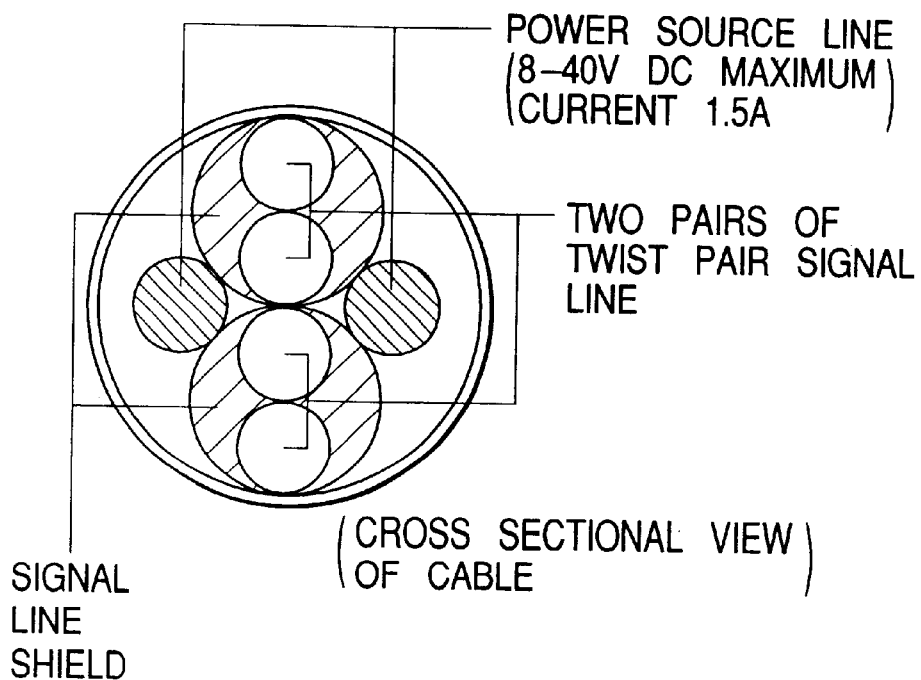
FIG. 6 is a cross sectional view of a communication cable in conformity with IEEE 1394 specifications.

FIG. 6 is a cross sectional view of a communication cable in conformity with IEEE 1394 specifications.

The communication cable has power lines in addition to two pairs of twist pair signal lines. Therefore, an apparatus without a power source or an apparatus with a power supply voltage lowered by some trouble can be supplied with power via the power lines by the 1394 interface.

A communication cable of a 4-pin type may also be used without using power lines. It is stipulated that a power supply voltage at the power line is 8 to 40 V, and a current is DC 1.5 A at a maximum.

Signals encoded by DS-Link (Data/Strobe Link) coding scheme are transmitted over the two pairs of twist pair signal lines.

Figure 7:
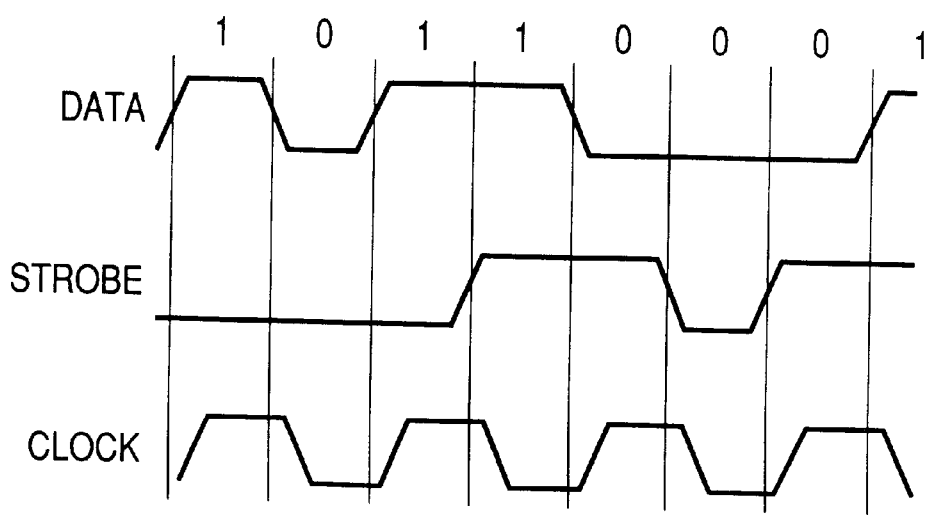
FIG. 7 is a diagram illustrating a DS-Link coding scheme.

FIG. 7 illustrates the DS-Link (Data/Strobe Link) coding scheme.

This DS-Link coding scheme is suitable for high speed serial data communications. It is necessary to use two pairs of signal lines. One pair of two twist pair signal lines is used for transmitting data signals, and the other of two twist pair signal lines is used for transmitting strobe signals.

On the reception side, a clock can be retrieved by an exclusive logical sum of the transmitted data and strobe signals.

The merits of the DS-Link coding scheme are as follows. A transmission efficiency is higher than other coding schemes. Since a PLL circuit is not necessary, the scale of a controller LSI can be made small. Since it is not necessary to transmit information representative of an idle state when there is no data to be transmitted, a transceiver circuit of each equipment can enter a sleep state and a power consumption can be lowered.

<Bus Reset Sequence>

The 1394 interface recognizes the network configuration by assigning each apparatus (node) connected to the network with a node ID.

When the network configuration varies with, for example, a change in the number of nodes to be caused by node connection/disconnection or power turn-on/off, and it becomes necessary to recognize a new network configuration. A node which detected a change transmits a bus reset signal to the bus to enter a mode of recognizing a new network configuration. This change is detected by a change in a bias voltage applied to the communication port 402.

When the bus reset signal is transmitted from a node to the network, the physical layer 403 of each node notifies the link layer 404 of a bus reset occurrence, and transmits the bus reset signal to other nodes. After the bus reset signal is transmitted to all nodes, a bus reset (i.e., a process of initializing the connection state and re-recognizing a new connection state) is activated.

The bus reset may be activated through hardware detection of a cable connection/disconnection, a network abnormality or the like and through a direct command issued to the physical layer 403 under host control using a protocol.

As the bus reset is activated, data transmission is temporarily stopped and enters a standby state. After the completion of the bus rest, the data transmission resumes under the new network configuration.

<Sequence of Node ID Determination>

In order to recognize the new network connection state after the bus reset, the 1394 interface executes a process of setting a node ID (constituted of a bus number and a node number) to each node. A general sequence from the start of a bus reset to the end of setting a node ID will be described with reference to FIGS. 8 to 11.

Figure 8:
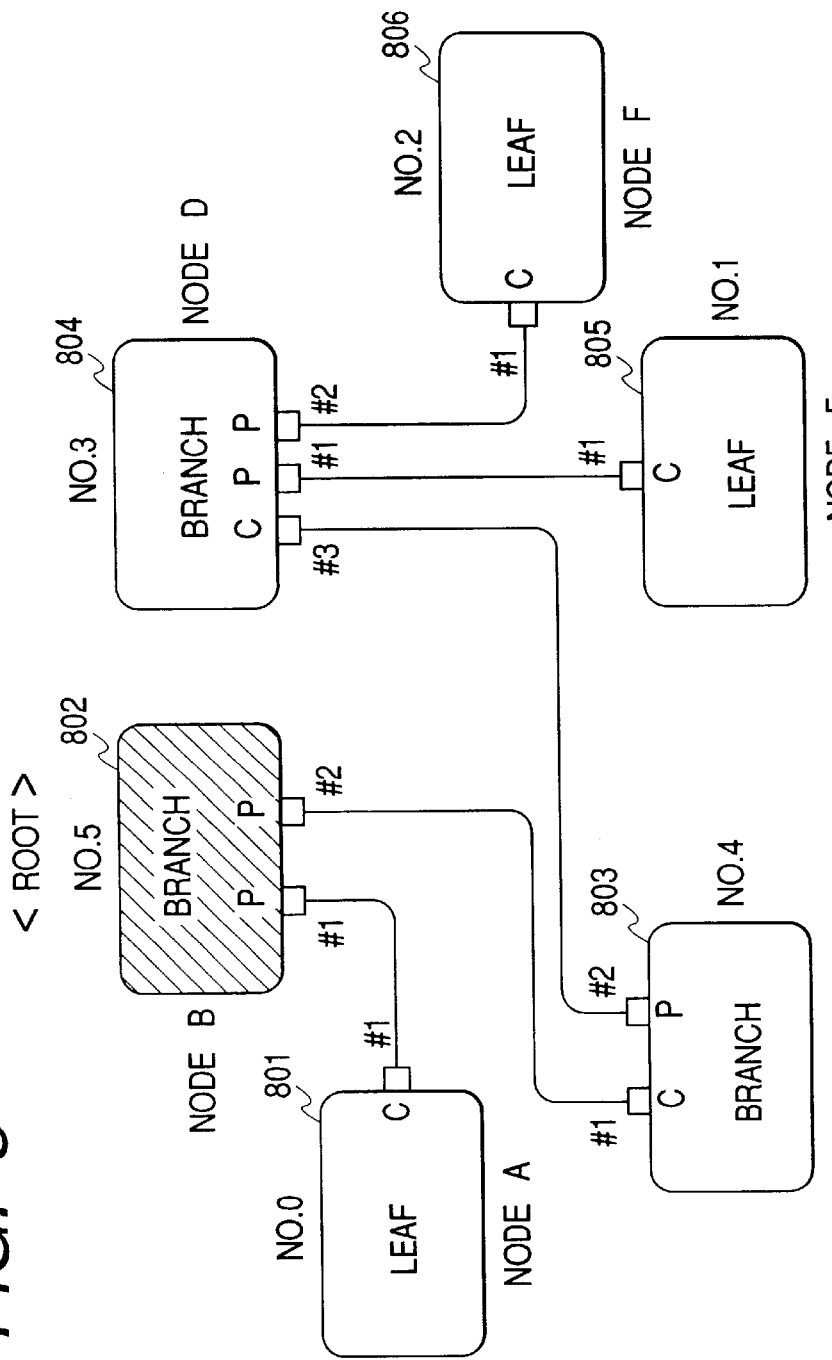
FIG. 8 is a schematic diagram showing an example of a communication system in conformity with IEEE 1394 specifications.

FIG. 8 is a diagram illustrating the exemplary operation of a communication system in conformity with IEEE 1394 specifications. In the example shown in FIG. 8, each node is connected to the same bus so that the same bus number is used for each node.

Referring to FIG. 8, reference numeral 801 represents a node A having one communication port, reference numeral 3002 represents a node B having two communication ports, reference numeral 803 represents a node C having two communication ports, reference numeral 3004 represents a node D having three communication ports, reference numeral 805 represents a node E having one communication port, and reference numeral 3006 represents a node F having one communication port. The communication port of each node is assigned a port number for discriminating between ports.

With reference to the flow chart shown in FIG. 9, the processes to be executed by the communication system shown in FIG. 8, from the bus reset to the data transfer start, will be described.

Figure 9:
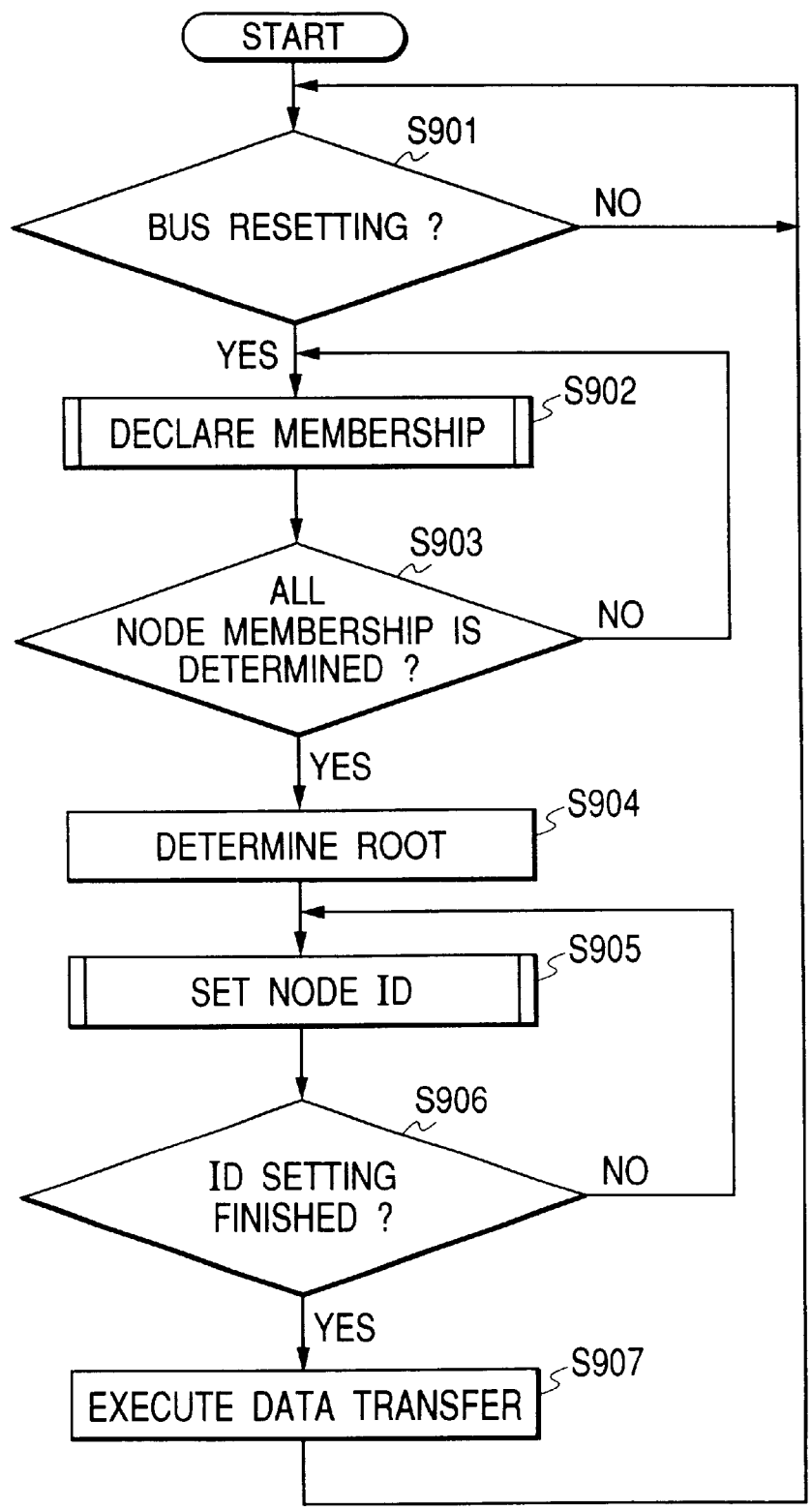
FIG. 9 is a flow chart illustrating the processes from bus reset to the start of data transfer.

In FIG. 9, each node A to F constituting the communication system always monitors whether a bus reset occurs in the network. When a bus reset signal is output because of a change in the network configuration to be caused by, for example, a node power on-off, each node executes the following processes.

Each node declares a membership determination of its communication ports in order to re-recognize the new connection state of the network (Step S902). Each node of the network repeats the process at Step S902 until the membership between all nodes is determined (Step S903). After the membership between all nodes on the network is determined, the communication system determines a node which arbitrates the network, i.e., a root (Step S904).

After the root is determined, the 1394 interface automatically assigns each node with a node ID (Step S905). The root repeats the process at Step S905 until all nodes are assigned with node IDs in accordance with a predetermined procedure (Step S906). After all nodes are assigned with node IDs, the 1394 interface executes data transmission between nodes (Step S907).

After the process at Step S907, the 1394 interface monitors again an occurrence of a bus reset, and when a bus reset occurs, the processes from Step S901 are executed.

In the above manner, with the 1394 interface, all nodes can recognize the network configuration through automatic assignment of each node ID by the root determined at each bus reset.

Figure 10:
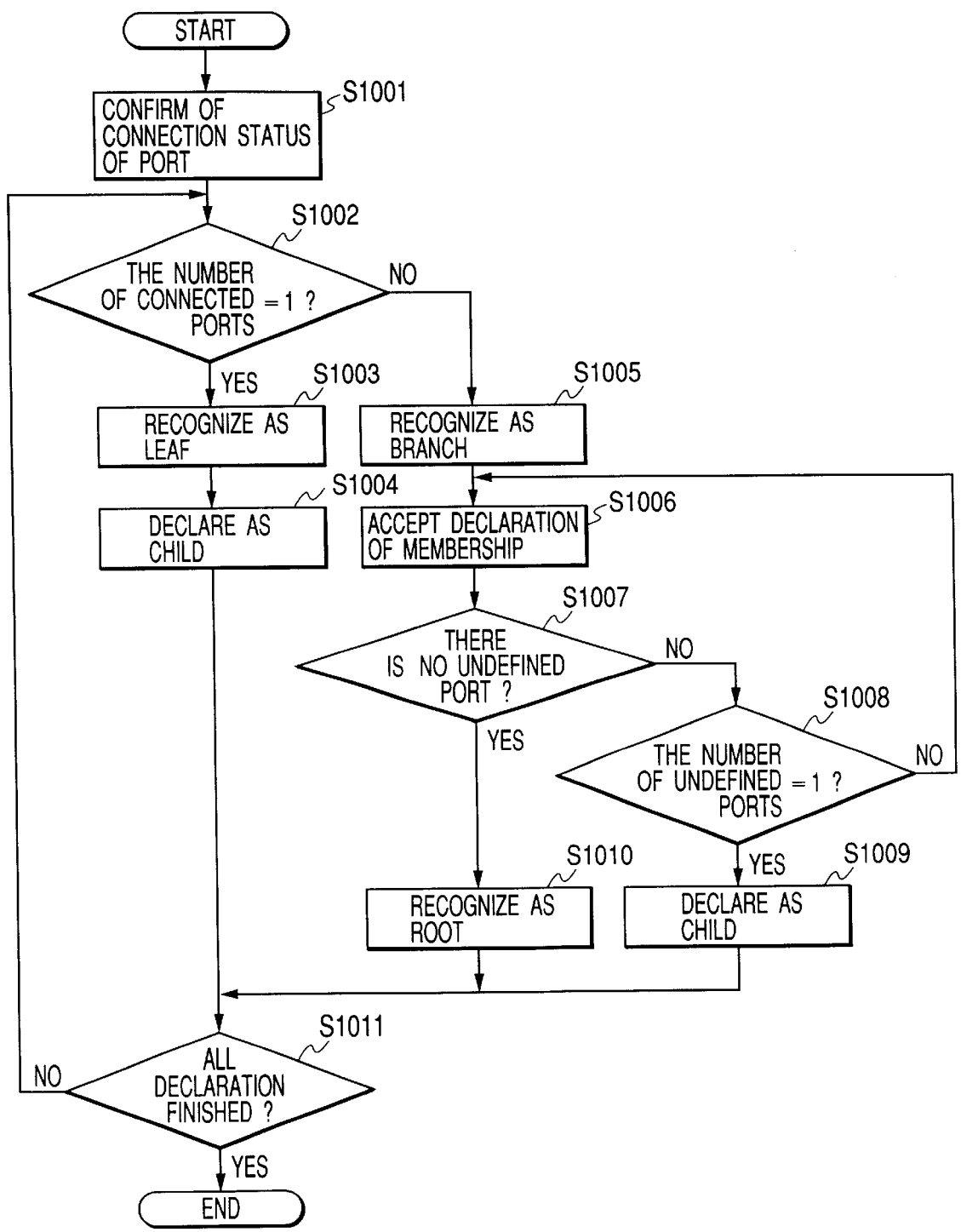
FIG. 10 is a flow chart illustrating the processes of discriminating a parent/child relationship (membership) of communication ports at respective nodes.

FIG. 10 is a flow chart illustrating the details of the process at Step S902 shown in FIG. 9, i.e., the process of recognizing the membership between node communication ports.

Referring to FIG. 10, each node A to F constituting the communication system confirms in response to the bus reset the connection state (connection or disconnection) of its communication port or ports, in order to judge whether the node is a leaf (node connected to only one apparatus) or a branch (node connected to a plurality of apparatuses) (Step S1001). The number of communications ports connected to other nodes is counted (Step S1002).

If it is judged at Step S1002 that the number of connected ports is "1", the node recognizes itself as a leaf (Step S1003). This leaf node declares to the node connected to the port that "I am a child and you are a parent" (Step S1004). The leaf recognizes its connection port as a "child port".

Declaration of the membership between communication ports can be made by a leaf node, because the leaf node has only one connected port, i.e., the leaf node is an outermost terminal of the network. The membership between communication ports is determined sequentially in the order of faster declaration, in which the communication port at the declaring communication node is determined as a child port and the communication port at the declared communication node is determined as a parent port. For example, in the example shown in FIG. 8, the nodes A, E and F recognize themselves as a leaf and thereafter declare the membership. Therefore, a child-parent membership is determined between nodes A–B, a child-parent membership is determined between nodes E–D, and a child-parent membership is determined between nodes F–D.

If it is judged at Step S1002 that the number of connected ports is "2" or larger, this node recognizes itself as a branch (Step S1005). The branch node receives the membership declaration from each node connected to its connection port (Step S1006). The connection port received the declaration is recognized as the parent port.

After the parent port is recognized, the branch checks whether there is any connection port (undefined port) whose membership is still not determined (Step S1007).

If there is an undefined port at Step S1007, it is checked whether the number of undefined ports is "1" (Step S1008). If "1", the branch recognizes the undefined port as the child port and declares to the node connected to the port that "I am a child and you are a parent" (Step S1009).

The branch cannot declare to another node that "I am a child" until the number of remaining undefined ports becomes "1". In the example shown in FIG. 8, the nodes B, C and D recognize themselves as a branch, and receive a declaration from another branch or leaf. After the memberships between D–E and D–F are determined, the node D declares the membership to the node C. Upon reception of the declaration from the node D, the node C declares the membership to the node B.

If the number of undefined ports is larger than "1" at Step S1008, the branch executes again the process at Step S1006.

If there is no undefined port at Step S1007 (if all connection ports of the branch become parent ports), the branch recognizes itself as the root (Step S1010).

In the example shown in FIG. 8, the node B whose all connection ports are parent, is recognized by other nodes as a node for arbitrating the communication system. Although it is assumed in this example that the node B is determined as the root, another node may become a root node if the membership declaration timing of the node B is faster than that of the node C. Namely, depending upon the declaration timing, any node has a possibility of becoming a root. Therefore, the same node is not necessarily a root in the same network configuration.

With the above processes, the membership for all nodes is determined so that the communication system can recognize the connection state in the form of a hierarchical structure (tree structure). The parent in the membership is at a higher hierarchical level and the child is at a lower level.

Figure 11:
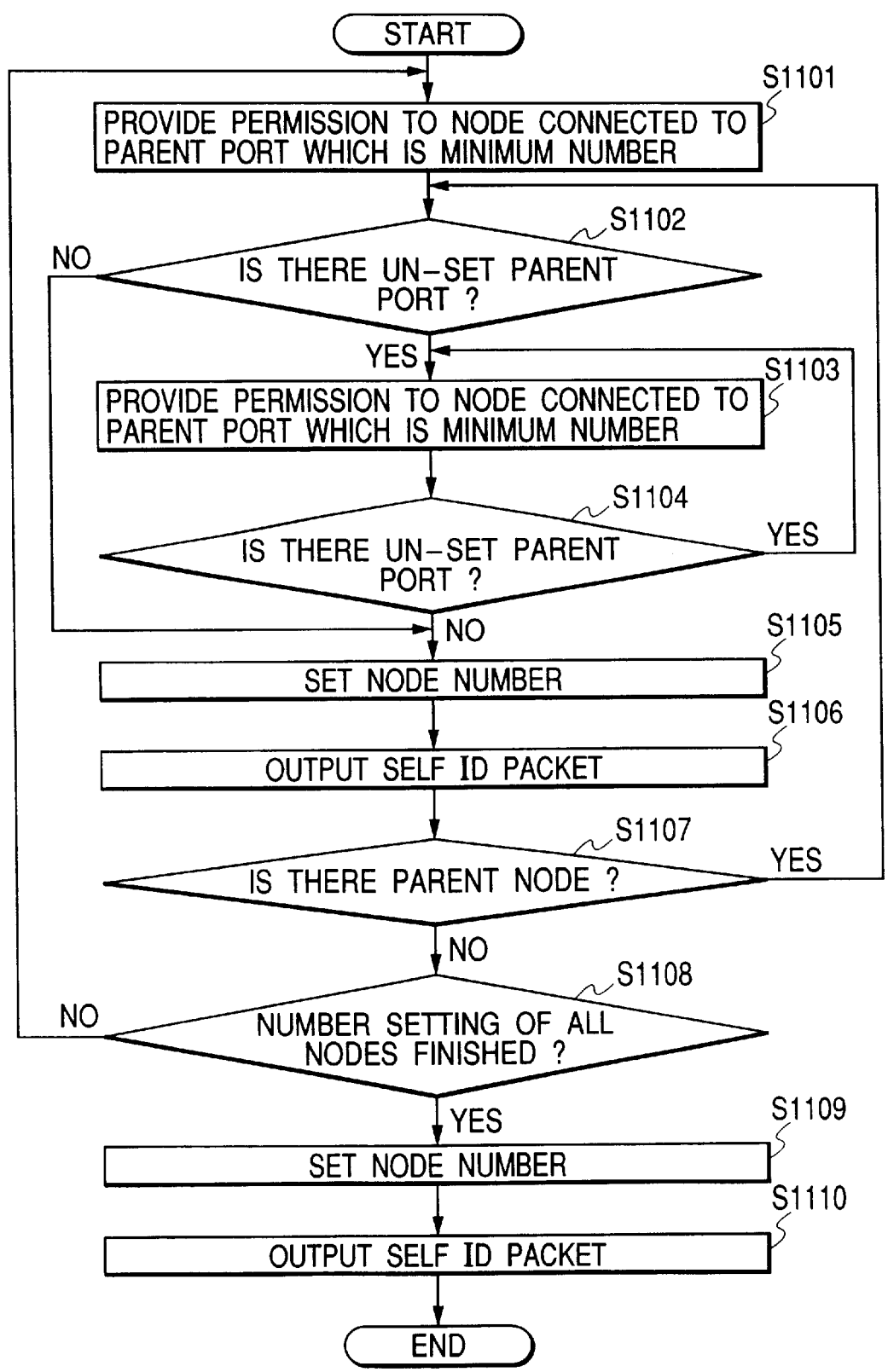
FIG. 11 is a flow chart illustrating the processes of automatically setting a node ID of each node.

FIG. 11 is a flow chart illustrating the details of the process at Step S905 shown in FIG. 9, i.e., the process of automatically setting the node ID (bus number and node number) of each node.

Referring to FIG. 11, the root permits a node to set a node ID, the node being connected to a communication port of the root and having a minimum number among its connection ports (Step S1101). After all nodes connected to the connection port having the minimum number are given node IDs, the root performs similar controls relative to the node connected to the next minimum port number. In this manner, the root node is given the last node ID. The node numbers contained in the node IDs are assigned "0", "1", "2", . . . basically in the order from leafs to branches. Therefore, the root has the largest node number.

The permitted node checks whether there is a parent port (communication port connected to a child node) still not set with the node ID (Step S1102).

If there is a parent port still not set with the node ID at Step S1102, the node permits the node connected to the minimum port number to set a node ID (Step S1103).

The node permitted at Step S1103 checks whether there is a parent port still not set with the node ID (Step S1104).

If it is checked at Step S1104 that there is a parent port still not set with the node ID, the permitted node executes again the process at Step S1103.

If there is no communication port still not set with the node ID at Step S1102 or at Step S1104, the permitted node sets its own node ID (Step S1105). The first node which first permitted the second node determines that the communication port of the first node has already been set.

The node which completed the node ID setting broadcasts a self ID packet containing its node ID information and its communication port connection state (Step S1106). The term "broadcast" means to transmit a communication packet from one node to all the nodes constituting a communication system. Upon reception of this self ID packet, each node can recognize the node ID assigned to each node.

For example, in the example shown in FIG. 8, the root node B permits the node A connected to the communication port with the minimum port number "#1" to set the node ID. The node number of the node A is therefore set to "No. 0", and the node A broadcasts the self ID packet containing the node number.

After the process at Step S1106, the node which set the node ID checks whether there is a parent node (Step S1107). If there is a parent node, the parent node again executes the processes starting from Step S1102 to give a permission to the node still not set with the node ID.

If there is no parent node, this node is judged to be the root. The root checks whether all nodes constituting the communication system were set with the node IDs (Step S1108).

If it is judged at Step S1108 that all nodes constituting the communication system are still not set with the node IDs, the root permits the node connected to the communication port with the next minimum port to set the node ID (Step S1101). Thereafter, the processes starting from Step S1102 are executed.

If all nodes were set with the node IDs, the root sets its own node ID (Step S1109). Thereafter, the root broadcasts a self ID packet (Step S1110) to terminate the node ID setting procedure.

With the above processes, the communication system can automatically assign each node with a node ID.

<Arbitration>

Figure 12A:
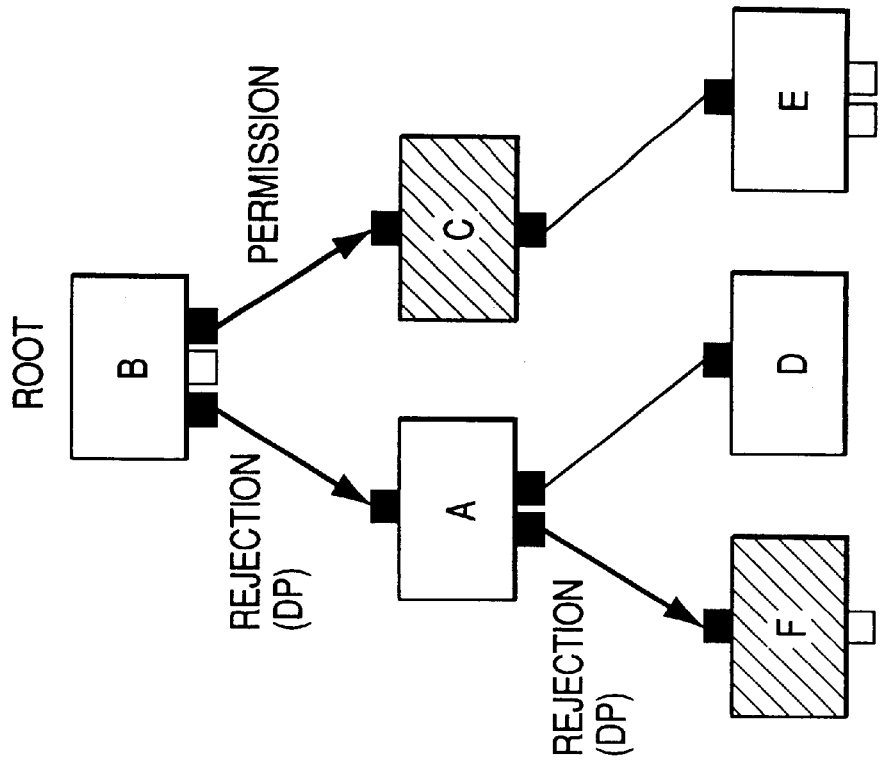
FIGS. 12A and 12B are diagrams illustrating arbitration of a 1394 interface.
Figure 12B:
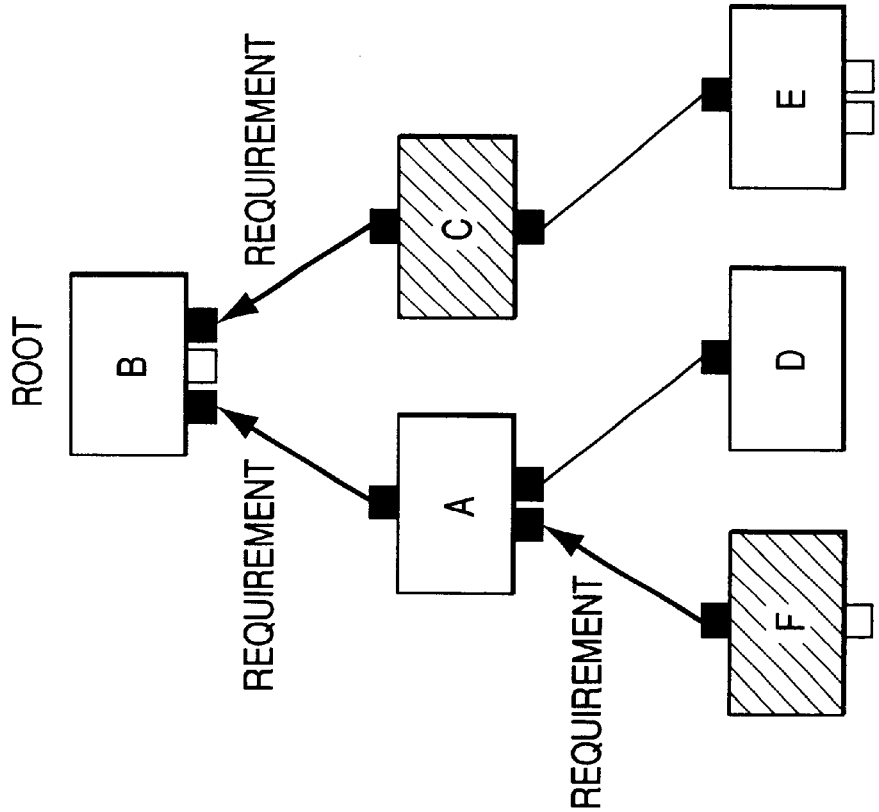

FIGS. 12A and 12B illustrate arbitration of the 1394 interface. In FIGS. 12A and 12B, a node B is a root, nodes A and C are branches, and nodes D, E and F are leaves.

With the 1394 interface, prior to data transmission, arbitration for a bus use privilege is performed necessarily. With the 1394 interface, a logical bus type network can be configured in which a communication packet transmitted to each node is relayed to another node to allow the communication packet to be transmitted to all nodes in the network system. Therefore, in order to prevent collision of communication packets, it is essential to perform arbitration. With this arbitration, only one node can transmit data at a time, FIG. 12A is a diagram illustrating the case wherein nodes C and F issue a request for bus use privilege. As arbitration starts, the nodes C and F issue a bus use privilege request to the parent node. Upon reception of the request from the node F, the parent node (i.e., node A) further issues a bus use privilege request to its parent node (i.e., relays the request from the node F). This request reaches the root (node B) which performs final arbitration.

The root received the bus use privilege request determines which node can use the bus. This arbitration work can be performed only by the root node, and the node succeeded the arbitration is given a bus use privilege. In the example shown in FIG. 12B, the node C is permitted to use the bus, and the request from the node F is rejected.

The root transmits a DP (data prefix) packet to the node which failed the arbitration to thereby inform the node of a failure. The rejected node stands by until the next arbitration for the bus use privilege.

By controlling the arbitration in the above manner, the communication system can control the use of the but by each node.

<Asynchronous Transmission Mode>

Figure 13:
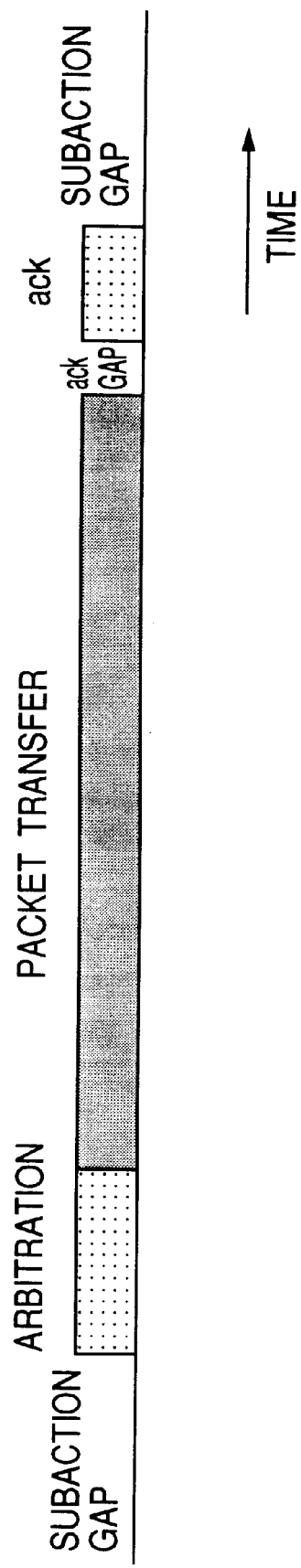
FIG. 13 is a diagram showing a time sequential transition state during asynchronous transmission.

The asynchronous transmission transmits data asynchronously. FIG. 13 shows a time sequential transition during the asynchronous transmission.

The first subaction gap shown in FIG. 13 indicates an idle state of the bus. When this idle time reaches a constant value, the node intending to transmit data judges that the bus can be used, and executes an arbitration for acquiring the bus.

If a use permission is obtained by the arbitration, the data in a packet format is transmitted. After the data transmission, the node received the asynchronous packet returns back an ack (reception confirmation return code) or a response packet after a short ack gap. The ack is constituted of four-bit information and four-bit check sums including information of a success, failure, or pending state, and is returned immediately to the transmission source node.

Figure 14:
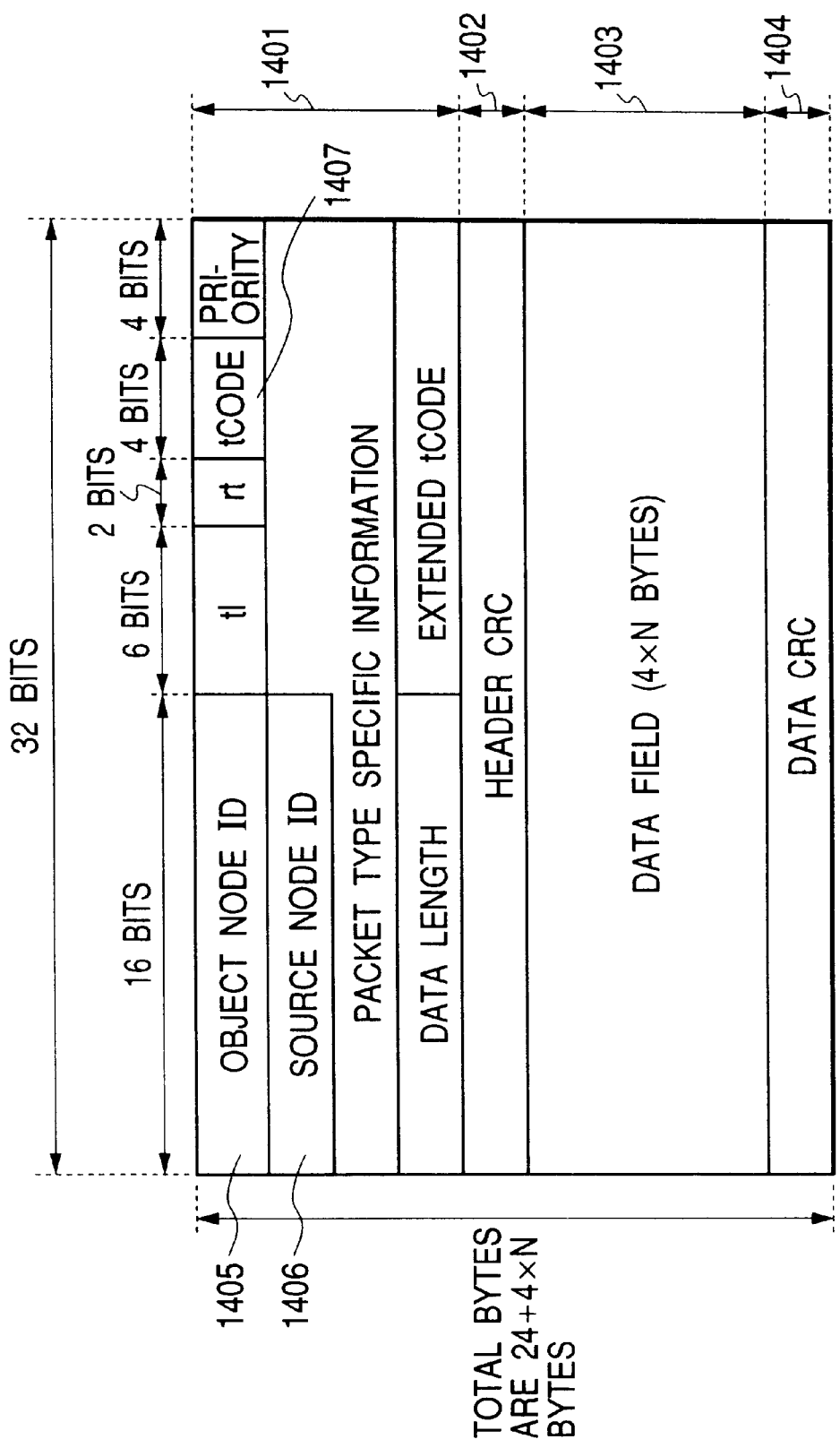
FIG. 14 shows an example of a packet format used by asynchronous transmission.

FIG. 14 shows an example of the packet format used by the asynchronous transmission. A communication packet transmitted in the asynchronous transmission mode is called an asynchronous packet.

Referring to FIG. 14, an asynchronous packet includes a header field 1401, a header CRC 1402, a data field 1403, and a data CRC 1404. The header field 1401 includes a field 1405 for storing an object node ID, a field 1406 for storing a source node ID, a field 1407 for storing a packet format and data for discriminating between processes to be executed (i.e., transaction code (tcode)), and other fields.

The asynchronous transmission is peer-to-peer communications between its own node and a partner node. A packet transmitted from the transmission source node is transmitted to each node of the network. However, the packet transmitted to each node and not having an address of the node is discarded, so that only one node having the object node address can read the packet.

<Isochronous Transmission>

The isochronous transmission transmits data synchronously. This mode is suitable particularly for real time data transmission required for multi media data such as video and audio data. Although the asynchronous transmission is peer-to-peer transmission, this isochronous transmission can broadcast a packet from one transmission source to all other nodes, by using the broadcast function. The isochronous transmission does not use the ack (reception confirmation return code).

Figure 15:
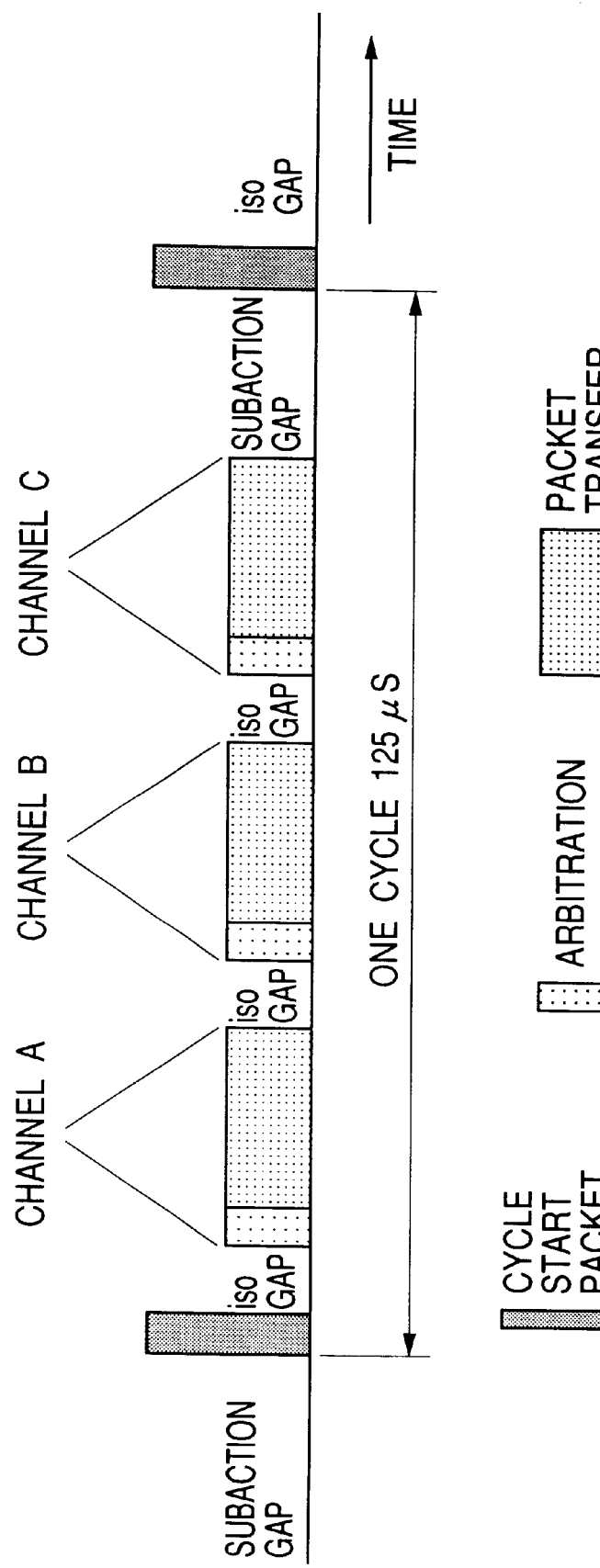
FIG. 15 is a diagram showing a time sequential transition state during isochronous transmission.

FIG. 15 shows a time sequential transition during the asynchronous transmission. In this embodiment, a communication packet transmitted during the isochronous transmission mode is called an isochronous packet.

Referring to FIG. 15, the isochronous transmission mode is executed each communication cycle. The communication cycle period is generally 125 $\mu$s. A cycle start packet is transmitted at the start of each communication cycle. This cycle start packet has a roll of adjusting time at each node. The cycle start packet is transmitted to all nodes after a predetermined idle period (subaction gap) after the completion of each communication cycle. One communication cycle period is a period from the transmission of a preceding cycle start packet to the reception of the succeeding cycle start packet.

In the example shown in FIG. 15, channels A, B and C represent bandwidths of different isochronous packets. With the 1394 interface, different channel numbers are assigned in order to discriminate between a plurality of different isochronous packets. It is therefore possible to transmit a plurality of isochronous packets to a plurality of nodes. This channel ID does not indicate the object node address, but it is only a logical number of data.

The iso gap (isochronous gap) shown in FIG. 15 is an idle period necessary for the recognition of an idle state of the bus prior to performing the isochronous transmission mode. After this idle period lapses, a node intending to perform isochronous transmission judges that the bus is idle and arbitration can be performed before the transmission.

The isochronous transmission mode is necessarily performed at each cycle in order to preserve real time transmission.

Figure 16:
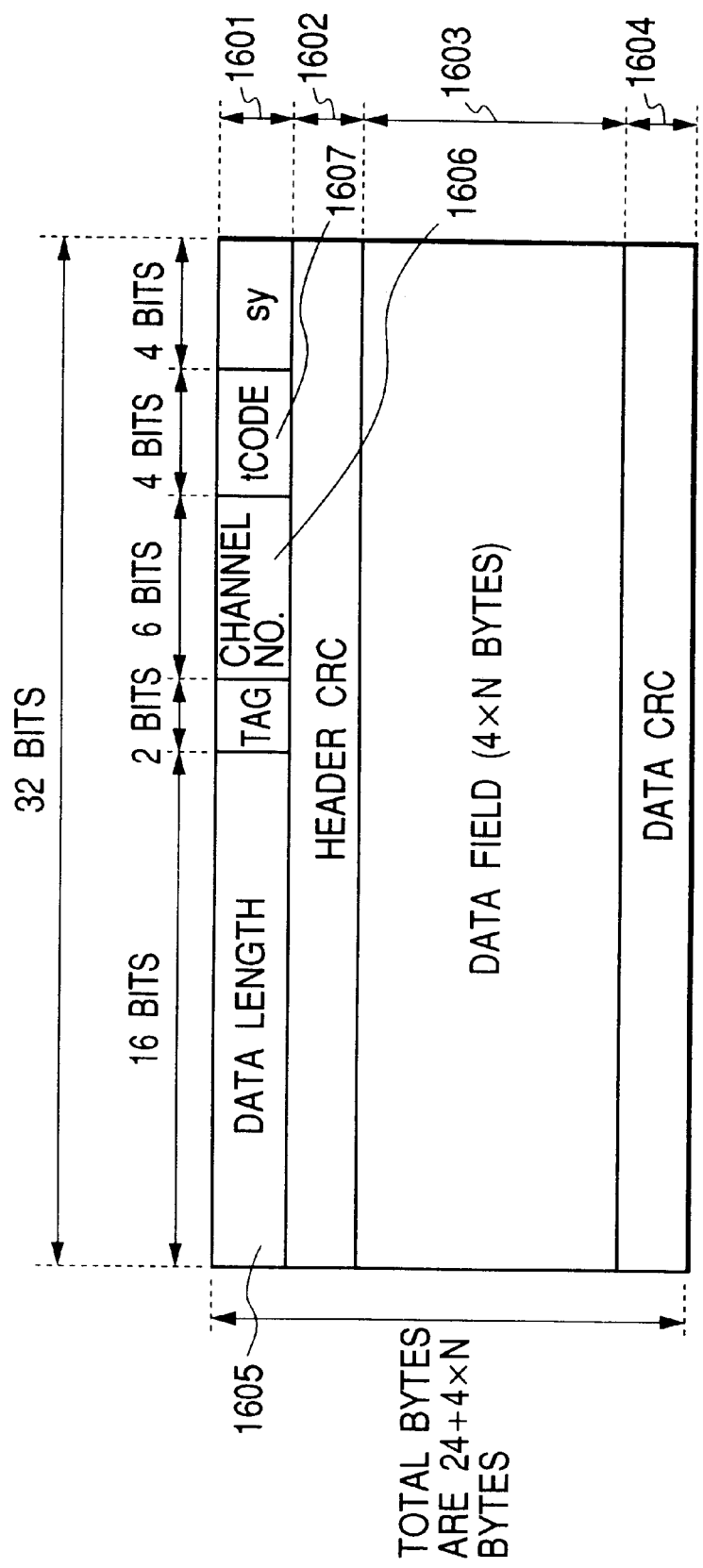
FIG. 16 shows an example of a packet format used by isochronous transmission.

FIG. 16 shows an example of the format of a packet used during the isochronous transmission mode.

Referring to FIG. 16, an isochronous packet includes a header field 1601, a header CRC 1602, a data field 1603 and a data CRC 1604. The data field 1603 includes a field 1605 for storing data representative of a data length, a field 1606 for storing data representative of a channel number of an isochronous packet, a field 1607 for storing a packet format and data (i.e., transaction code (tcode)) for discriminating between processes to be executed, and other fields.

<Bus Cycle>

Both the isochronous and asynchronous transmission mode can be performed in each communication cycle.

Figure 17:
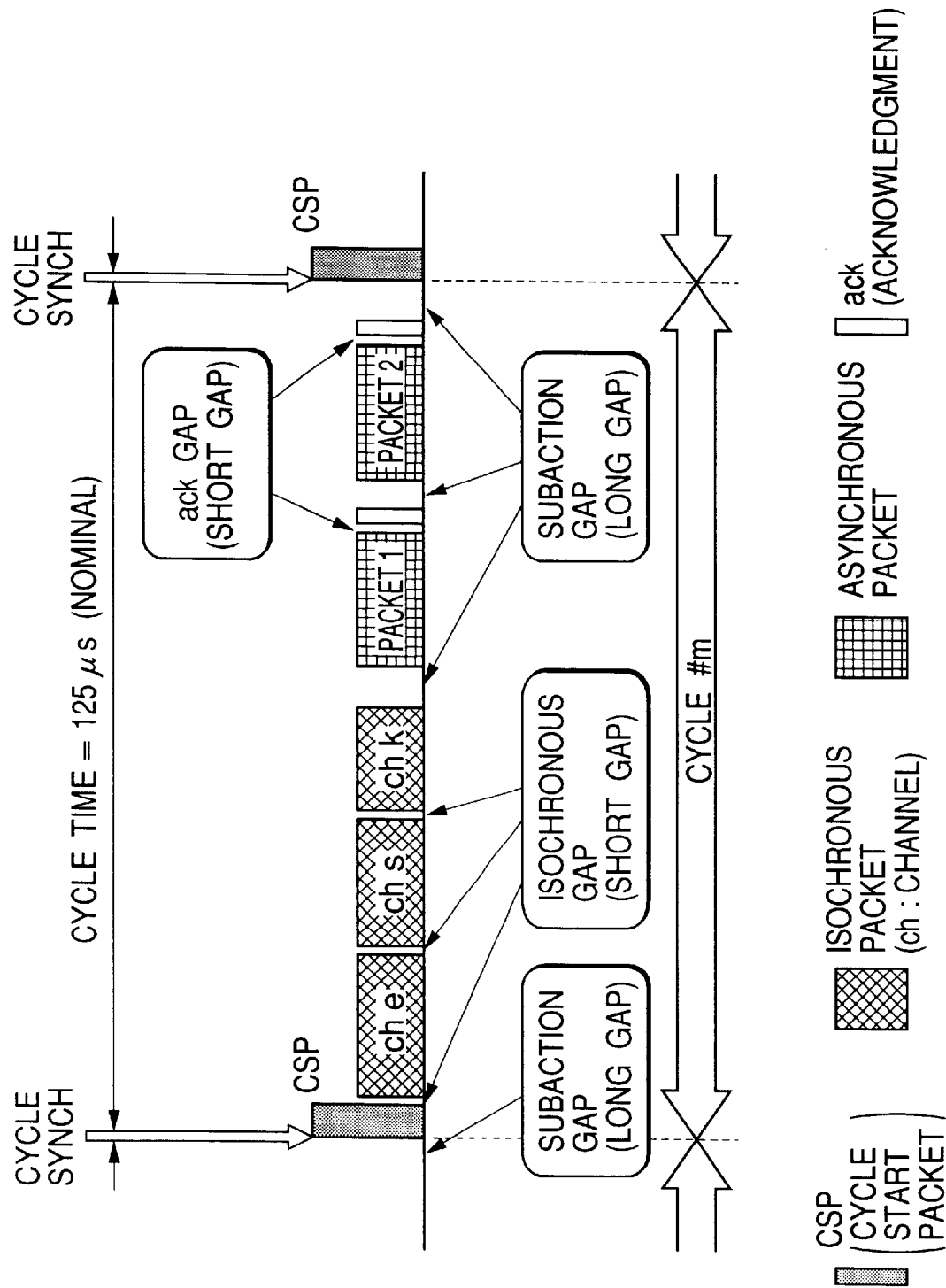
FIG. 17 is a diagram illustrating both isochronous and asynchronous transmissions in one communication cycle.

FIG. 17 shows a time sequential transition of both the isochronous and asynchronous transmissions in one communication cycle.

The isochronous transmission mode is performed with a priority over the asynchronous transmission mode. The reason for this is that the isochronous transmission can be performed after the cycle start packet, with a shorter gap length (isochronous gap) necessary for the isochronous transmission than a gap length (subaction gap) of the idle period necessary for performing the asynchronous transmission. The isochronous transmission is therefore performed with a priority over the asynchronous transmission.

Referring to FIG. 17, at the start of the communication cycle #m, a cycle start packet is transmitted to each node. Each node performs time adjustment by using this packet.

After the isochronous gap, a node intending to perform isochronous transmission transmits an isochronous packet. In the example shown in FIG. 17, isochronous packets of a channel e, a channel s and a channel k are transmitted after each isochronous gap.

After the isochronous packet is transmitted for a predetermined time period, each node can transmit the asynchronous packet. The asynchronous transmission by each node is executed after the subaction gap. The period while the asynchronous transmission can be performed, is during the period after the isochronous transmission and before the time (cycle synch) when the next cycle start packet is transmitted.

If it becomes the time (cycle synch) when the next cycle start packet is transmitted while the asynchronous packet is transmitted, the asynchronous packet is not forcibly intercepted, but after the completion thereof, the next cycle start packet is transmitted. If one communication cycle continues longer than 125 µs, the next communication cycle period is shortened correspondingly.

The structure and function of the communication system using 1394 interfaces have been described above.

<Direct Print System using IEEE 1394 Specifications>

With reference to FIG. 2, a direct print system using IEEE 1394 specifications will be described.

In FIG. 2, reference numeral 201 represents a digital VTR integrated with a camera as a recording/reproducing device capable of recording/reproducing digital image data of a predetermined format (e.g., SD-VTR, MPEG) on/from a recording medium. The digital VTR integrated with a camera 201 can converts digital image data stored in a recording medium into a packet and transmit it to an external apparatus in accordance with a predetermined procedure. Reference numeral 202 represents a printer capable of printing digital image data reproduced with the digital VTR integrated with a camera 201, and reference numeral 203 represents a monitor capable of displaying still and moving images transmitted from the digital VTR integrated with a camera 201.

The communication system shown in FIG. 2 is illustrative only, and the connection state may be changed as desired different from that shown in FIG. 2, or various other apparatuses may be connected to this system. Apparatuses connected to this system may be other electronic apparatuses such as a hard disk, a CD player, a DVD player, so long as they can conform with IEEE 1394 specifications and can configure a network.

Figure 18:
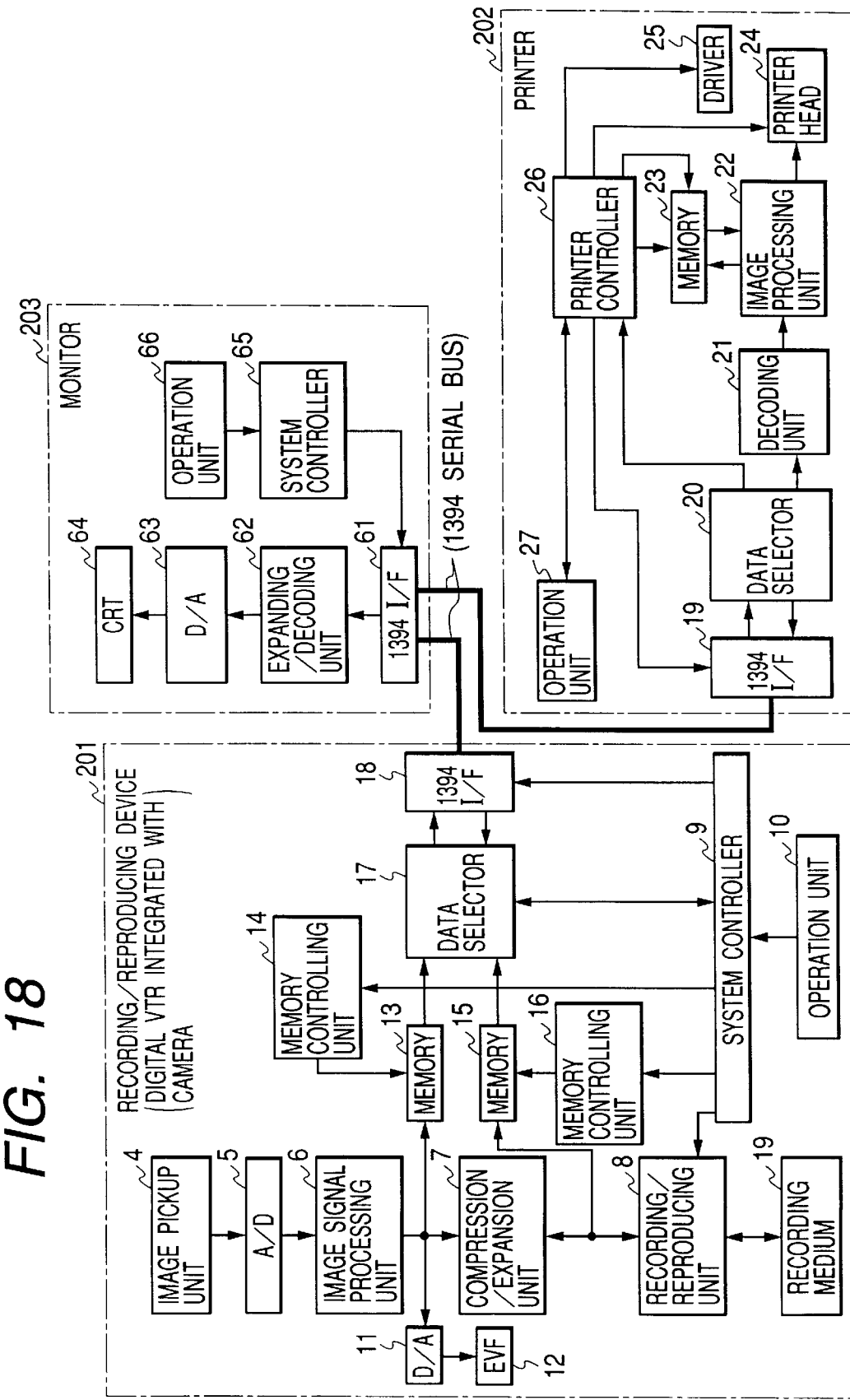
FIG. 18 is a diagram showing the details of the structure of the communication system shown in FIG. 2.

With reference to FIG. 18, the structure of the communication system shown in FIG. 2 will be described in detail.

In a recording/reproducing device (a digital VTR integrated with a camera) 201 shown in FIG. 18, reference numeral 4 represents an image pickup unit, 5 represents an A/D converter, 6 represents an image processing unit, 7 represents a compression/expansion unit for performing a compression encoding during recording and an expansion decoding during reproducing in accordance with a predetermined algorithm, 8 represents a recording/reproducing unit for recording/reproducing moving or still images on/from a recording medium 19 with a recording/reproducing head or the like, 9 represents a system controller having a microcomputer and a memory for storing predetermined program codes, 10 represents an operation unit for entering information to control the digital VTR integrated with a camera 201, 11 represents a D/A converter, 12 represents an EVF (Electric View Finder) used for displaying a reproduced image or a picked-up image, 13 represents a memory for temporarily storing non-compression encoded image data of N frames, 14 represents a memory controller for controlling timings of reading data from, or writing data into, the memory 13, 15 represents a memory for temporarily storing compression encoded image data of N frames, 16 represents a memory controller for controlling timings of reading data from, or writing data into, the memory 15, 17 represents a data selector for selecting outputs of the memories 13 and 15, 18 represents a 1394 interface for performing communications in conformity with IEEE 1394 specifications, and 19 represents a recording medium of a magnetic tape. In the first embodiment, the digital VTR integrated with a camera using a magnetic tape as its recording medium is used. Instead a digital camcorder using an optical disk, a solid state memory and the like may also be used as the recording medium.

In a printer 202 shown in FIG. 18, reference numeral 19 represents a 1394 interface of the printer 202, 20 represents a data selector for selecting either control data or image data, 21 represents a decoding unit for decoding image data compression encoded with a predetermined algorithm, 22 represents an image processing unit for forming a print image, 23 represents a memory used by the image processing unit 22 when a print image is formed, 24 represents a printer head, 25 represents a drive for driving the printer head and feeding a recording sheet, 26 represents a printer controller for controlling each part of the printer 202, and 27 represents an operation unit for entering information for controlling the printer.

In a monitor 203 shown in FIG. 18, reference numeral 61 represents a 1394 interface of the monitor 203, 62 represents an expansion/decoding unit for expansion decoding video data compression encoded by a predetermined algorithm, 63 represents a D/A converter, 64 represents a CRT, 65 represents a system controller for controlling each part of the monitor 203, and 66 represents an operation unit for entering information for controlling the monitor 203. In the first embodiment, in addition to the above components, the monitor 203 is equipped with a circuit for receiving and displaying a known television signal.

Next, the operation of each apparatus constituting the communication system shown in FIG. 2 will be described.

<Operation of Recording/Reproducing Device 201>

In a "record mode", an analog image signal (including moving and still images) picked up with the image pickup unit 4 is digitalized by the A/D converter 5 and processed by the image signal processing unit 6. One output (standard television signal of NTSC format) of the image signal processing unit 6 is converted into analog signals of the image now being taken by the D/A converter and displayed by EVF 12. The other output is compression encoded by the compression/expansion unit 7 in accordance with a predetermined algorithm and recorded in the recording medium by the recording/reproducing unit 8. The compression encoding includes a JPEG format used by digital cameras or the like, a compression format based on DCT (discrete cosine transform) and VLC (variable length coding) used by home digital VTRs or the like, an MPEG format, and the like.

In a "reproduce mode", the recording/reproducing unit 8 reproduces a desired image stored in the recording medium. In this case, a desired image is selected in accordance with a user instruction entered from the operation unit 10, and reproduced under the control of the system controller 9. If the image data reproduced by the recording medium is to be transmitted in the compression state, the reproduced data is stored in the memory (frame memory) 15. If the image data is to be transmitted in the non-compression state, the reproduced data is expansion decoded by the compression/expansion unit 7 and stored in the memory 13. If the reproduced image data is to be displayed by EVF 12, it is expanded by the compression/expansion unit 7, converted into analog signals by the D/A converter 11, and supplied to EVF 12 to display images.

Read/write of the frame memories 13 and 15 is controlled by the memory controllers 14 and 16 under the control of the system controller 9. The read image data is supplied to the data selector 17. In this case, the data selector 17 is controlled to select one of the outputs from the frame memories 13 and 15 at a time.

Although the system controller 9 controls each part of the recording/reproducing device 201, it can also perform the following control. Namely, it generates command data for controlling the printer 202 and monitor 203 and asynchronously transmits the command to the printer and monitor via the data selector 17 and 1394 interface 18. It also controls each part of the recording/reproducing device 201 by using various command data asynchronously transmitted from the printer 202 and monitor 203. For example, a command data indicating a presence/absence of a decoder or the type of a decoder asynchronously transmitted from the printer 202 or monitor 203 is supplied as a request command to the system controller 9. Thereafter, in accordance with the command data, it is judged whether image data of either compression or non-compression is to be transmitted from the recording/reproducing device 201. In accordance with this judgement, a command is transmitted to the memory controller 14, 16 to read proper one of the image data from the frame memory 13, 15.

The judgement whether image data of either compression or non-compression is to be transmitted is performed in accordance with the information of a decoder of the printer 202 or monitor 203. If it is judged from the decoder information that the compression encoding of the recording/reproducing device 201 can be decoded, the compression encoded image data is read from the memory 15, whereas if it is judged that the compression encoding cannot be decoded, the non-compression encoded image data is read from the memory 13.

The image data and command data supplied to the data selector 17 are transmitted by the 1394 interface 18 to the cable in accordance with the IEEE 1394 specifications, and received by the printer 202 if the image data is the print still image data, or by the monitor 203 if the image data is the display moving image data. The command data is also asynchronously transmitted to a desired node when necessary. Real time data mainly moving image data and audio data is isochronously transmitted, whereas command data is asynchronously transmitted. Among data generally isochronously transmitted, some data may be asynchronously transmitted depending upon the transmission conditions or if asynchronous transmission is preferable.

<Operation of Printer 202>

In operation of the printer 202, data input to the 1394 interface 19 is classified into respective types of data by the data selector 20. Data to be printed such as still image and compression encoded is expansion decoded by the decoding unit 21 and thereafter output to the image processing unit 22. As described earlier, the recording/reproducing device 201 transmits data by selecting either compression encoding or non-compression encoding so as to have optimum transmission, in accordance with the previously transmitted information of a presence/absence of a decoder or the type of a decoder. Therefore, if the transmitted data was compression encoded, the decoding unit 21 of the printer 202 can expansion decode the received data in a method corresponding to the compression encoding. If the transmitted data was non-compression encoded, this case corresponds to either the case that the printer 202 has no decoding unit 21 or the case that the printer 202 has the decoding unit 21 which cannot deal with the compression of the recording/reproducing device 201. In such a case, the received data is directly supplied to the print image processing unit 22 without passing through the decoding unit 21. If not the image data but the command data for the printer 202 is input, it is not necessary to expansion decode it, so that the decoding unit 21 is not used.

For example, print still image data input to the image processing unit 22 is processed so as to make it suitable for printing and generate print image data by using the memory 23 whose read/write is controlled by the printer controller 26. This print image data is sent to the printer head 24 and printed out. Driving the head of the printer 202 and feeding a recording sheet are performed by the driver 25, and the control of the driver 25 and printer head 24 and other controls are performed by the printer controller 26.

The operation unit 27 has a monitor circuit for displaying a paper feed state, reset state, ink check state, and printer 202 operation state (standby, start, stop), and informs a user of these states. In accordance with the displayed information, the user operates upon the operation unit 27 to control each part of the printer 202.

Next, if the data input to the 1394 interface 19 is command data for the printer 202, a notice to this effect is informed from the data selector 20 to the printer controller 26. The printer controller 26 then controls each part of the printer 202 so as to follow the instruction of the command data.

The printer controller 26 can output information of the type of a decoder of the decoding unit 21 or the presence/absence of the decoding unit 21 of the printer 202, and can transmit it asynchronously as the command data to the recording/reproducing device 201.

The expansion decoding of the decoding unit may be, for example, a JPEG format. Decoding of the JPEG format can be performed by software. Therefore, by using a JPEG decoding program file stored in a ROM of the decoding unit 21 or by using a decoding program transmitted from another node, the decoding unit 21 may decode the received data by software. For example, if the image data compression encoded by the JPEG format is transmitted from the recording/reproducing device 201 to the printer 202, this image data can be decoded by the printer 202 so that the transmission efficiency can be improved more than non-compression data is transmitted. By using decoding through software, the printer 202 is not necessary to have a decoder, lowering manufacture cost. The decoding unit 21 may have a JPEG decoding circuit (board) as hardware.

As described above, a so-called direct print is performed without using a management apparatus such as a PC, when still image data is transmitted from the recording/reproducing device 201 to the printer 202.

<Operation of Monitor 203>

Next, the processes to be performed at the monitor 203 will be described. Moving image data transmitted from the recording/reproducing device 201 to the 1394 interface 61 of the monitor 203 is supplied to the expansion decoding unit 62. The expansion decoding unit 62 expansion decodes the moving image data by using an expansion decoding method having a predetermined algorithm.

In the monitor 203, in accordance with an instruction input from the operation unit 66, the system controller 65 controls each part of the monitor 203.

The moving image data transmitted to the monitor 203 is compressed or non-compressed so as to have optimum transmission, in accordance with the previously transmitted information of a presence/absence of a decoder or the type of a decoder which the recording/reproducing device 201 received, similar to the case of the printer 202. Therefore, even if the received moving image data is compression encoded data, this received data can be decoded through expansion decoding having a predetermined algorithm corresponding to the expansion decoding unit 62 of the monitor 203.

In displaying the moving image data on CRT 64, if the data is compressed encoded data, it is expansion decoded by the expansion decoding unit 62 and thereafter supplied to the D/A converter 63 to be displayed on CRT 64, whereas if it is non-compression encoded data, it is directly supplied to the D/A converter 63 and displayed on CRT 64.

For example, the expansion decoding unit 62 of the monitor 203 may be a dedicated hardware board capable of performing a decoding process for an MPEG format for example, or a ROM storing program codes which perform a decoding process for an MPEG format or a JPEG format through software. The type or presence/absence of such a decoder is transmitted from the monitor 203 to the recording/reproducing device 201.

With the structure constructed as above, prior to transmitting the moving or still image data from the recording/reproducing device 201 to the printer 202 or monitor 203, the recording/reproducing device 201 can receive the information of a decoder of the printer 202 or monitor 203 asynchronously transmitted. Accordingly, in accordance with the performance of the decoder at an object node, the recording/reproducing device 201 selectively transmits compression encoded image data itself if it can be decoded, or non-compression image data if the encoded data cannot be decoded.

<Transmission Sequence of Image Data>

Next, with reference to the flow chart of FIG. 19, the operation of the recording/reproducing device 201 when image data (including moving and still images) is transmitted, will be described.

Figure 19:
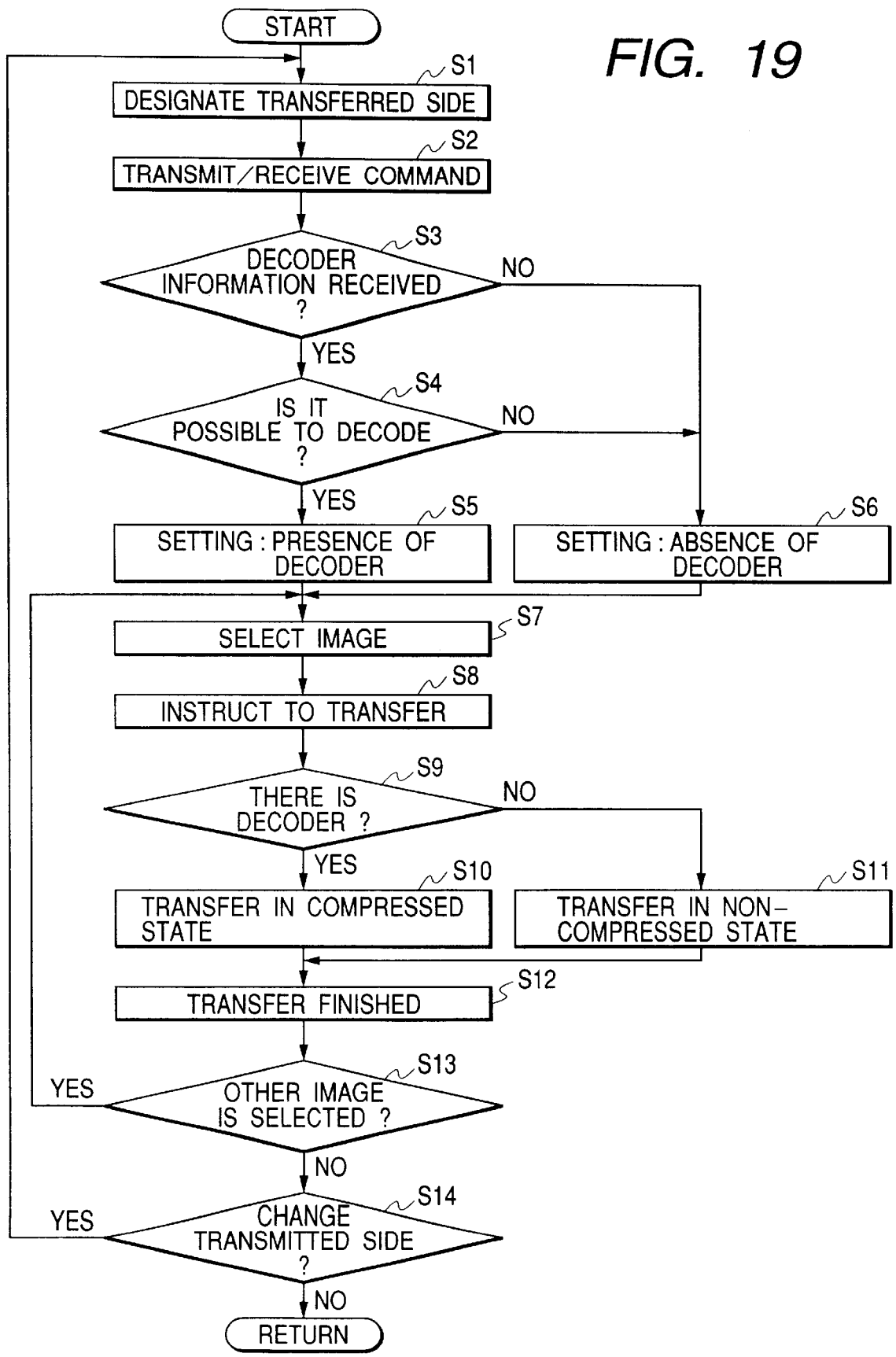
FIG. 19 is a flow chart illustrating the operation of the recording/reproducing device shown in the first embodiment.

FIG. 19 illustrates a mode of transmitting image data from the recording/reproducing device 201 to another apparatus via the 1394 interfaces. First, at Step S1 the recording/reproducing device 201 performs data transmission setting for an object node in accordance with a user's designation. At Step S2, the recording/reproducing device 201 asynchronously transmits a command to an object node, the command including predetermined information notifying the object node of that transmission will starts soon and information urging the object node to transmit the information of a presence/absence, type and the like of a decoder. Upon reception of the command transmitted at Step S2, the object node asynchronously transmits to the recording/reproducing device 201 a predetermined transmission confirmation command data including decoder information.

Upon reception of the transmission confirmation command data, the system controller 9 of the recording/reproducing device 201 checks whether the decoder information was able to receive. If the decoder information was received and the presence and type of the decoder was able to identify, the flow advances to Step S4. On the other hand, the flow advances to Step S6 if the received command data does not contain the decoder information, if it contains information indicating that the decoder is not present, or if the command data is not transmitted from the object node or is not received until a predetermined time lapse because of a bus transmission error or asynchronous transmission delay.

The decoder information contained in the command data transmitted from the object node to the source node or recording/reproducing device 201 is used for judging whether image data to be compressed and stored is transmitted or is non-compressed and thereafter transmitted. Namely, the decoder information has a roll of informing the source node of that the object node wants to receive either compressed data or non-compressed data. Therefore, if the object node, e.g., monitor 203 already knows the information of the compression scheme used by the source node or recording/reproducing device 201, a command requesting to receive either compressed image data or non-compressed image data may be returned in response to the command data transmitted at Step S2 from the recording/reproducing device 201, instead of returning the command data containing the decoder information of the monitor 203.

Next, at Step S4 if the type of the decoder judged from the received decoder information corresponds to the decoder which can deal with the compression encoding having a predetermined algorithm used by the compression/expansion unit 7 of the recording/reproducing device 201, then the recording/reproducing device 201 judges that the object node can decode image data. Thereafter, at Step S5 the recording/reproducing device 201 controls an output of the memory 15 in order to isochronously or asynchronously transmit the compression encoded image data. If it is judged at Step S4 that the type of the decoder cannot deal with the compression encoding used by the recording/reproducing device 201 or if the decoder information was not able to receive at Step S3 (i.e., if it is judged that there is no decoder at the object node), then at Step S6 the recording/reproducing device 201 expansion decodes the image data. In order to isochronously or asynchronously transmit non-compressed image data, the recording/reproducing device 201 controls an output of the memory 13.

After the output format is set in accordance with the type of the object node as described above, at Step S7 the user selects moving images stored in the recording medium 19 in order to print or display it. The recording/reproducing device 201 reads the selected moving image. After the image is selected, at Step S8 the user instructs a transmission of the desired image.

Next, in accordance with the setting at Step S5 or S6, it is checked at Step S9 whether the object node has a decoder. If it has, at Step S10 the compressed image data reproduced from the recording medium 19 is transmitted. Specifically, in response to the transmission instruction at Step S8, the system controller 9 and memory controller 16 control an output read from the memory 15. If the object node has no decoder, at Step S11 non-compressed image data expanded at the compression/expansion unit 7 is transmitted. Specifically, in response to the transmission instruction at Step S8, the system controller 9 and memory controller 16 control an output read from the memory 13. In this embodiment, a packet of moving image data is transmitted by the isochronous transmission in conformity with IEEE 1394 specifications, and a packet of still image data is transmitted by the asynchronous transmission.

When desired image data is transmitted at Step S12, it is checked at Step S13 whether other image data is to be transmitted. If other image data is selected, the processes at Step S7 and following Steps are repeated. If other image data is not selected, the flow advances to Step S14 whereat it is judged whether the image data transmission mode continues by changing an object node. If it continues, the processes at Step S1 and following Steps are repeated. If it is judged at Step S14 that the mode is not necessary to be continued with a changed an object node, this flow is terminated. This flow starts from Step S1 in response to a transmission response of moving or still images.

As described above, in this embodiment, the recording/reproducing device 201 acquires information of which decoding method an object node has, from the object node to which image data is to be transmitted. If it is judged from the acquired information that the recording/reproducing device encodes image data by a procedure corresponding to the decoding method of the object node, then image data encoded by the corresponding encoding procedure is transmitted, whereas if it is judged contrarily, encoded image data is decoded and thereafter transmitted. Accordingly, even if the source node uses any type of a decoding method, encoded data corresponding to the decoding method can be reliably transmitted. If the same encoding and decoding methods are used by an object node, encoded data can be transmitted and received so that communications can be speeded up. The capacity of a memory required for transmission/reception can be reduced if decoded data is transmitted.

In the first embodiment, it is judged whether encoded data reproduced from the recording medium 19 is to be transmitted directly or after it is decoded, in accordance with the decoding performance of the object node. The invention is not limited only thereto. For example, it may be judged whether data still not stored in the recording medium 19 is to be transmitted directly or after it is encoded.

Figure 20:
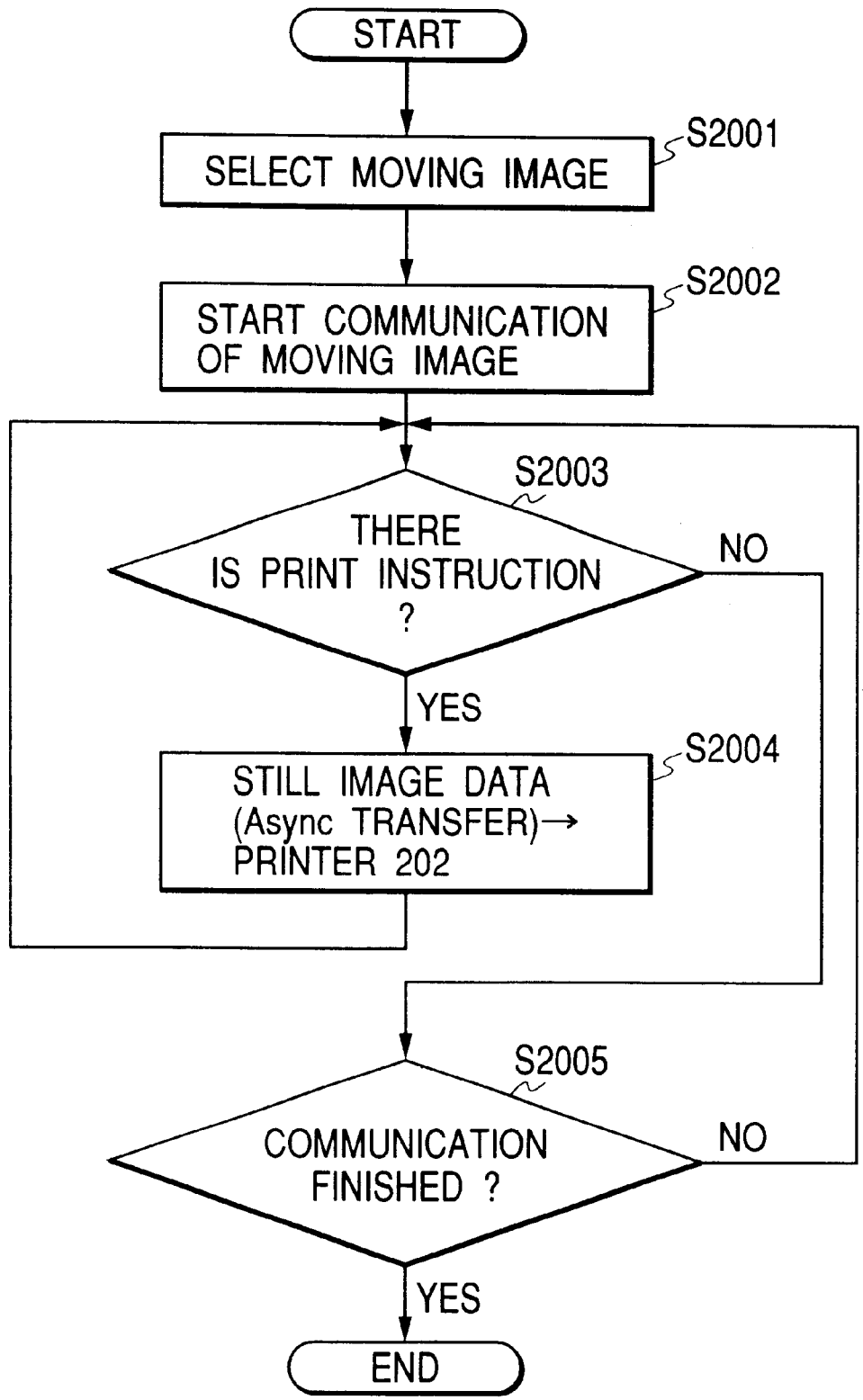
FIG. 20 is a flow chart illustrating the exemplary operation of the communication system of the first embodiment.

Next, with reference to the flow chart shown in FIG. 20, another operation will be described in which moving image data taken with, for example, the digital VTR integrated with a camera 201 is isochronously transmitted and a still image contained in the moving images is printed with the printer 202.

In the first embodiment, the decoding unit 21 of the printer 202 does not match the encoding method of a still image generated by the digital VTR integrated with a camera 201. Therefore, a still image to be transmitted to the printer 202 from the digital VTR integrated with a camera 201 is non-compression encoded.

Also in the first embodiment, the expansion decoding unit 62 of the monitor 203 matches the encoding method of a moving image generated by the digital VTR integrated with a camera 201. Therefore, a moving image to be transmitted to the monitor 203 from the digital VTR integrated with a camera 201 is compression encoded.

In the "record mode", in transmitting moving image data to an external apparatus, a user selects a moving image from a desired time point with the operation unit 10 and instructs to transmit the moving image (Step S2001). The moving image data output from the image signal processing unit 6 is compression encoded in a predetermined manner by the compression/expansion unit 7, and the compressed image data is supplied to the memory 15. In parallel with this operation, of the moving image data output from the image processing unit 6, still images in the unit of several frames are supplied to the memory 13 without being compression encoded.

When the operation state of the digital VTR integrated with a camera 201 is set to the "reproduce mode", the recording/reproducing unit 8 selects desired moving images and reproduces them from the recording medium 19 (Step S2001). The desired moving images are selected in accordance with various instructions entered from the operation unit 10, and in accordance with these instructions, the system controller 9 controls the reproducing operation of the recording/reproducing unit 8. The compression encoded moving image data reproduced from the recording medium 19 is directly supplied to the memory 15. In parallel with this operation, the moving image data is expanded by the compression/expansion unit 7, supplied to the D/A converter 11, and stored in the memory 13 in the unit of several frames.

The moving image data stored in the memory 15 is read and supplied to the data selector 17 when necessary in order to transmit it in real time to the external apparatus, under the control of the memory controller 16. The still image data stored in the memory 13 is read and supplied to the data selector 17 when necessary in order to asynchronously transmit it to the external apparatus, under the control of the memory controller 14. The read control by the memory controller 14 is controlled by the system controller 9 to start in response to an instruction (i.e., transfer request for still image) from the operation unit 10.

In the first embodiment, a user instructs to start moving image communications by using a communication mode start switch (not shown) or the like mounted on the operation unit 10. In transmitting a still image contained in the moving image data under transmission to the printer 202 or the like, a user selects a desired still image by operating upon the operation unit 10 in a predetermined operation sequence. In this manner, the still image is transmitted by being time divisionally multiplexed with the moving image being isochronously transmitted.

In the first embodiment, although the system controller 9 controls each process of the digital VTR integrated with a camera 201, it can also perform the following operation. Namely, it generates a control command for controlling the external apparatus (e.g., printer 202) connected via the 1394 interface 18 and 1394 serial bus and asynchronously transmitting it to the external apparatus via its 1394 interface 18. The 1394 interface 18 can receive control data transmitted from an external apparatus connected to the serial bus, and in accordance with the control data, the system controller 9 controls the operation of the digital VTR integrated with a camera 201. Therefore, for example, it is possible for the monitor 202 to instruct a transmission of a still image contained in the moving image at a desired time point from the digital VTR integrated with a camera 201 to the printer 202, by using the operation unit 10.

The data selector 17 selectively outputs one of the encoded moving image data output from the memory 15, the non-encoded still image data output from the memory 13, and the control command data output from the system controller 9, and supplies the selected data to the 1394 interface 18.

The 1394 interface 18 transmits information data such as moving and still images and control data for controlling internal and external apparatuses, by using a communication method in conformity with the 1394 serial bus. After an instruction of a communication start entered from the operation unit, a moving image taken with the digital VTR integrated with a camera 201 is isochronously transmitted to a number of undefined external apparatuses at each predetermined communication cycle (e.g., 125 $\mu$s) over a reserved transmission bandwidth (Step S2002). Specifically, the moving image data in the unit of a predetermined data amount is converted into an isochronous packet shown in FIG. 16 and broadcast to the communication network.

Command data for selecting a still image to be transmitted or controlling the operation of an external apparatus is transmitted irregularly to an object node designated by the operation unit 10 or by the external apparatus. For example, in transmitting and printing still image data at the object node printer 202 on the 1394 serial bus, a user designates the object node by operating upon the operation unit 10 in a predetermined operation sequence to thereby asynchronously transmit the still image data (Step S2003).

The still image data input to the 1394 interface 18 is converted into an asynchronous packet shown in FIG. 14 and transmitted to the designated object node. In the above manner, the digital VTR integrated with a camera 201 can transmit in real time the moving image data to all external apparatuses on the 1394 serial bus and can asynchronously transmit the still image data to only the designated object node (Step S2004).

Figure 21:
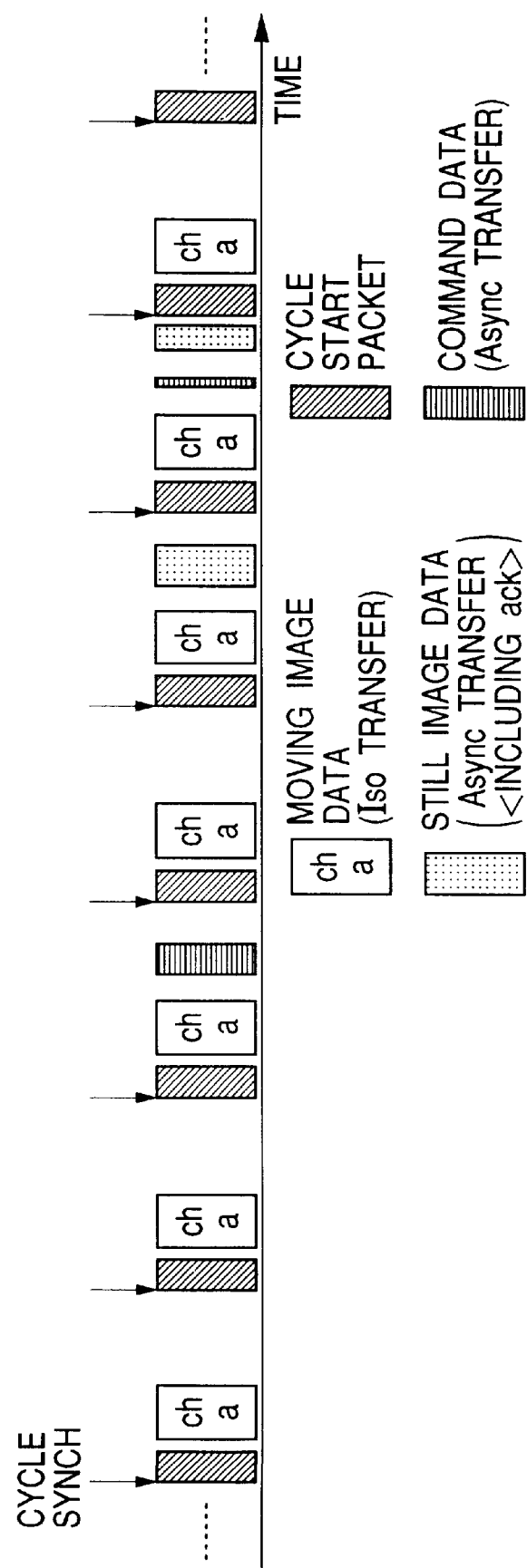
FIG. 21 is a diagram illustrating moving image and still image data transmitted in the communication system of the first embodiment.

FIG. 21 shows an example of time sequential transition of moving image and still image data transmitted over the 1394 serial bus.

Referring to FIG. 21, ch (channel). a represents moving image data transmitted in an isochronous transmission mode. A communication cycle (e.g., 125 $\mu$s) of the 1394 serial bus is partitioned by a cycle start packet necessary for making generally coincident the values of cycle timers of apparatuses on the 1394 serial bus. After the cycle start packet, there is an isochronous packet transmission period. The 1394 interface 18 transmits the moving image data ch. a packetized in accordance with a predetermined communication protocol, over the transmission bandwidth. The period after the isochronous transmission and before the next communication cycle is an asynchronous packet transmission period. During this period, the 1394 interface 18 transmits an asynchronous packet (including still image and command data) when necessary, reliably to a specific object node. In this manner, the isochronous packet (isochronous communication data) and asynchronous packet (asynchronous communication data) are time divisionally multiplexed in each predetermined communication cycle and transmitted over the 1394 serial bus.

The digital VTR integrated with a camera 201 of the first embodiment converts the compression encoded moving image data into an isochronous packet in conformity with the predetermined communication protocol, and isochronously transmits it as illustrated in FIG. 21. The non-compression encoded still image data contained in the moving image data is asynchronously transmitted as illustrated in FIG. 21. In this manner, the digital VTR integrated with a camera 201 can isochronously transmit moving image data in each predetermined communication cycle period and can isochronously transmit still image data by time divisionally multiplexing it with the isochronous transmission. Similarly, the digital VTR integrated with a camera 201 can asynchronously transmit a control command for controlling the operation of an external apparatus on the 1394 serial bus. Namely, the 1394 interface 18 isochronously transmits moving image data in each predetermined communication cycle period and asynchronously transmits still image data when necessary by using an idle period of the predetermined communication cycle period, so that the serial bus can be efficiently used. The above processes are executed until the moving image data communication process is terminated (Step S2005).

The moving and still image data generated by the digital VTR integrated with a camera 201 is transmitted to each apparatus on the 1394 serial bus. The monitor 203 on the 1394 serial bus is previously set so that it can cover the transmission bandwidth (ch. a) used by the digital VTR integrated with a camera 201 and can receive the isochronous packet (containing moving image data) in the bandwidth. The moving image data contained in the received isochronous packet is supplied to the expansion decoding unit 62 which performs a decoding process suitable for the received moving image data. Thereafter, the moving image data is converted into an analog signal by the D/A converter 63 and displayed on CRT 64. In this case, the operation unit 66 may be used to transmit a control command for instructing to print a desired still image, to the digital VTR integrated with a camera 201. In response to this control command, the digital VTR integrated with a camera 201 starts transmitting the still image.

The 1394 interface 19 of the printer 202 receives an asynchronous packet (containing still image or control command) transmitted from the digital VTR integrated with a camera 201, and supplies the received data to the data selector 20. The data selector 20 supplies the received data to the printer controller 26 if it is a control command, or to the image processing unit 28 if it is a still image. The image processing unit 28 processes the still image so as to make it suitable for printing, and thereafter the processed still image is printed.

The printer 202 of the first embodiment is configured to be able to print a non-compression encoded and asynchronously transmitted still image. Therefore, even if a printer cannot deal with the encoding method used by the digital VTR integrated with a camera 201, a high quality image can be printed with a simple system configuration.

The digital VTR integrated with a camera 201 of the first embodiment can transmit moving image data taken therewith to display it on the monitor 203. A user can select a still image to be printed, while viewing the moving image displayed on the monitor 203. In accordance with this selection, the digital VTR integrated with a camera 201 asynchronously transmits a desired still image while transmitting the moving image in real time. In other words, the digital VTR integrated with a camera 201 can transmit time divisionally both the moving and still images.

As described above, according to the first embodiment, if a source node apparatus uses an encoding method corresponding to the decoding method at an object node apparatus, the source node can transmit image information encoded by this encoding method. If the source node apparatus is not provided with an encoding method corresponding to the decoding method at an object node apparatus, the source node can transmit decoded image information. In this manner, the use efficiency of a communication transmission path can be improved.

The digital VTR integrated with a camera 201 of the first embodiment can broadcast in real time compression encoded or non-compression encoded moving image information in accordance with the decoding performance of an object node. Similarly, compression encoded or non-compression encoded still image information can be transmitted reliably only to an object node, in accordance with the decoding performance of the object node.

The communication system of the first embodiment can not only select still image information contained in moving image information without using an editing apparatus such as PC, but also print the still image information with ease and quickly, without imparting unnecessary load on other apparatuses.

2. Second Embodiment

In the first embodiment, compression encoded moving images are transmitted in real time by the isochronous transmission, and non-compression encoded still images are transmitted asynchronously by the asynchronous transmission.

In the second embodiment, compression encoded moving image is transmitted by the isochronous transmission, and a plurality frame of non-compression encoded still images are transmitted sequentially by the isochronous transmission.

In the second embodiment, the processing units having similar operations and functions to those of the first embodiment are represented by using identical reference numerals, and the description thereof is omitted.

Figure 22:
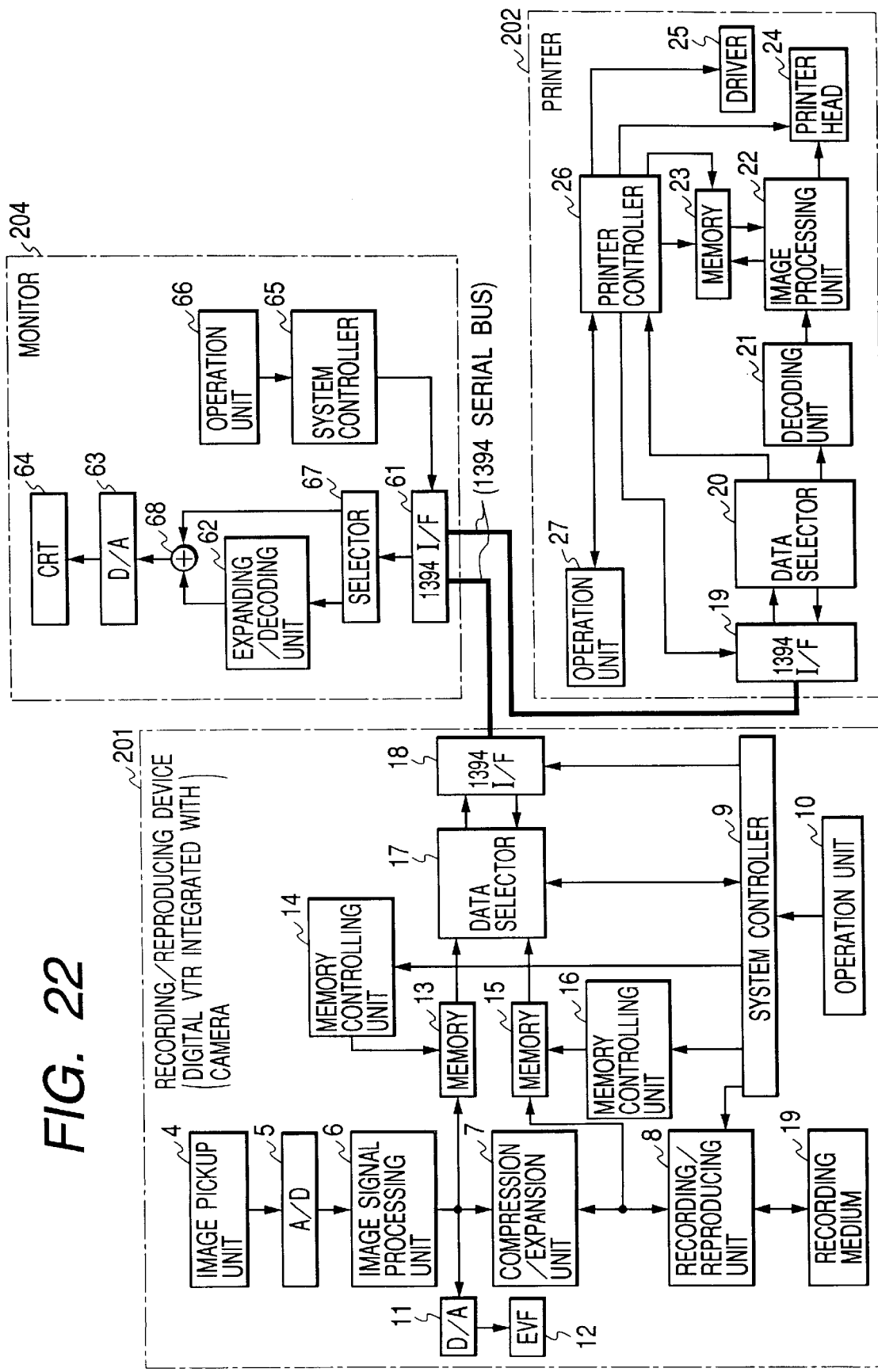
FIG. 22 is a diagram showing the structure of a communication system according to a second embodiment of the invention.

With reference to FIG. 22, the structure of a communication system of the second embodiment will be described.

In FIG. 22, the structures of a digital VTR integrated with a camera 201 and a printer 202 are similar to those of the first embodiment. A monitor 204 has a selector 67 and an adder 68 in addition to the structure of the monitor 203 of the first embodiment.

Figure 23:
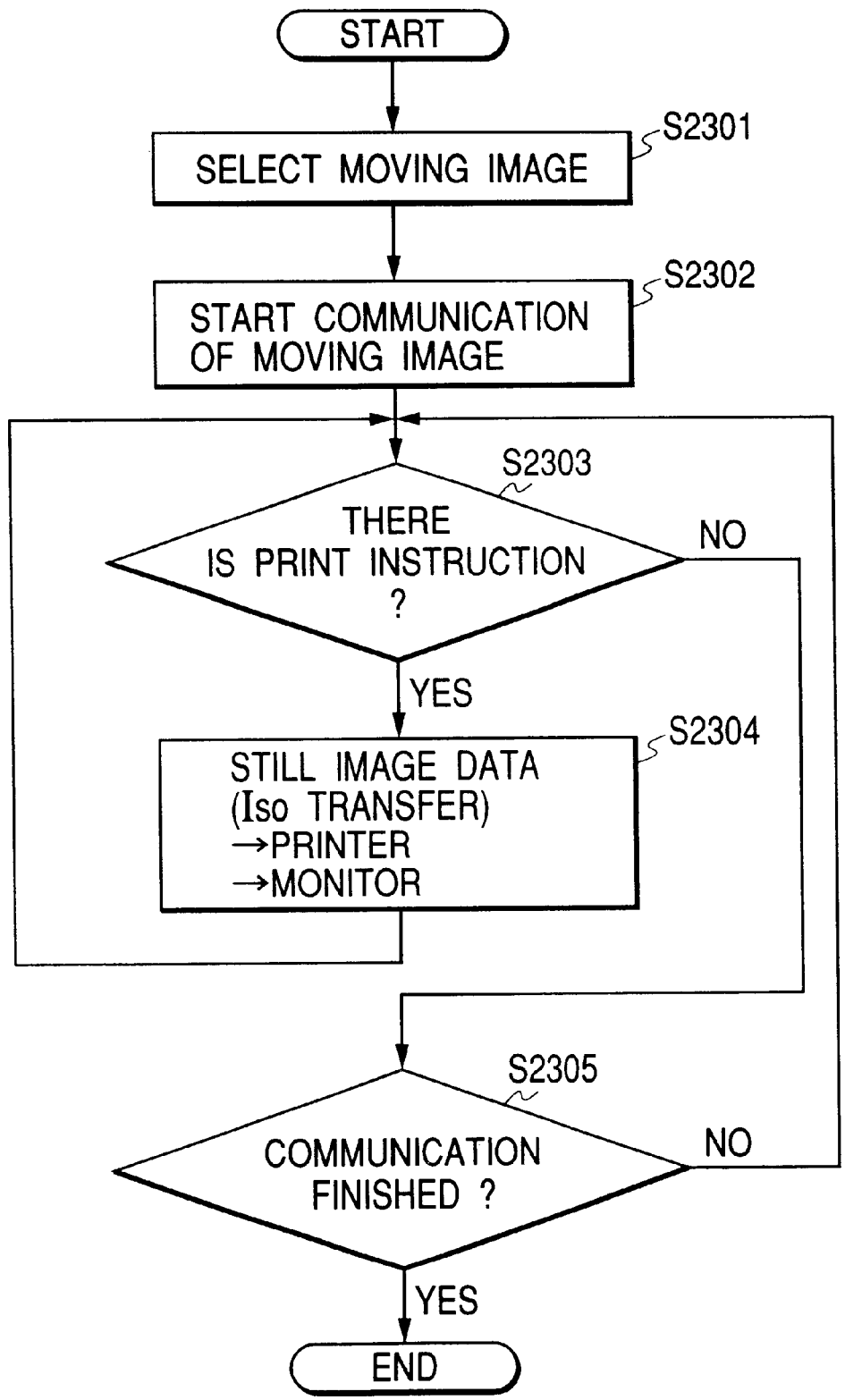
FIG. 23 is a flow chart illustrating the exemplary operation of the communication system of the second embodiment.

With reference to the flow chart shown in FIG. 23, an operation will be described in which moving image data taken with, for example, the digital VTR integrated with a camera 201 is isochronously transmitted and a still image contained in the moving images is printed with the printer 202.

In the second embodiment, the decoding unit 21 of the printer 202 does not match the encoding method of a still image generated by the digital VTR integrated with a camera 201. Therefore, similar to the first embodiment, a still image to be transmitted to the printer 202 from the digital VTR integrated with a camera 201 is non-compression encoded.

Also in the second embodiment, the expansion decoding unit 62 of the monitor 203 matches the encoding method of a moving image generated by the digital VTR integrated with a camera 201. Therefore, a moving image to be transmitted to the monitor 204 from the digital VTR integrated with a camera 201 is compression encoded.

A user selects a moving image from a desired time point with the operation unit 10 of the digital VTR integrated with a camera 201 (Step S2301).

The compression encoded moving image stored in the memory 15 is read so that it can be transmitted at each predetermined communication cycle (e.g., 125 μs) after a communication start instruction from the operation unit 10 (Step S2302).

The non-compression still image stored in the memory 13 is read in response to an instruction from the operation unit 10 or an external apparatus (Step S2303).

The still and moving image data of a predetermined data amount read under the control of the memory controllers 14 and 16 is alternately supplied via the data selector 17 to the 1394 interface 18. The 1394 interface 18 converts the still and moving image data input in the unit of the predetermined data amount into isochronous packets and isochronously transmits them to the printer 202 and monitor 204 (Step S2304).

In the second embodiment, a plurality frame of still images are isochronously transmitted. Therefore, the monitor 204 and printer 202 on the communication network can receive a plurality of still images transmitted from the digital VTR integrated with a camera 201 generally at the same time and a desired still image can be displayed or printed at respective apparatuses.

The command data for controlling the operation of an external apparatus is irregularly and asynchronously transmitted to an object node designated by the operation unit 10 or by the external apparatus, similar to the first embodiment.

Figure 24:
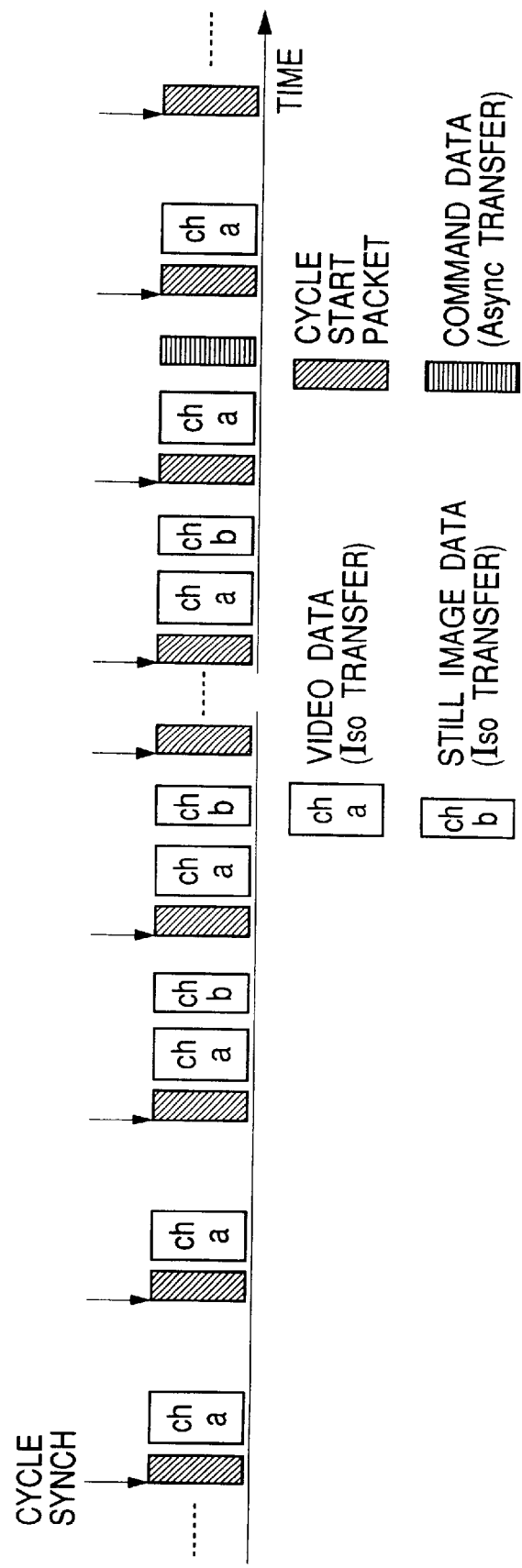
FIG. 24 is a diagram illustrating moving image and still image data transmitted in the communication system of the second embodiment.

FIG. 24 shows an example of time sequential transition of moving image and still image data transmitted over the 1394 serial bus.

Referring to FIG. 24, ch (channel). a represents moving image data packetized in accordance with the isochronous transmission method. Similarly, ch. b represents still image data packetized in accordance with the isochronous transmission method.

After the cycle start packet is transmitted, the moving image data and a plurality frame of still image data packetized in accordance with the predetermined communication protocol are transmitted via the 1394 interface over the transmission bandwidths of ch. a and ch. b. During the period after the isochronous transmission and before the next communication cycle, the 1394 interface 18 transmits an asynchronous packet (including command data) when necessary. In this manner, the isochronous packet (isochronous communication data) and asynchronous packet (asynchronous communication data) are time divisionally multiplexed in each predetermined communication cycle and transmitted over the 1394 serial bus.

The above processes are executed until the moving image data communication process is terminated (Step S2305).

In addition, in the second embodiment, the monitor 204 is previously set so that it can cover the transmission bandwidths (ch. a, ch. b) used by the digital VTR integrated with a camera 201 and can receive the moving and still image data isochronously transmitted from the digital VTR integrated with a camera 201.

Figure 25:
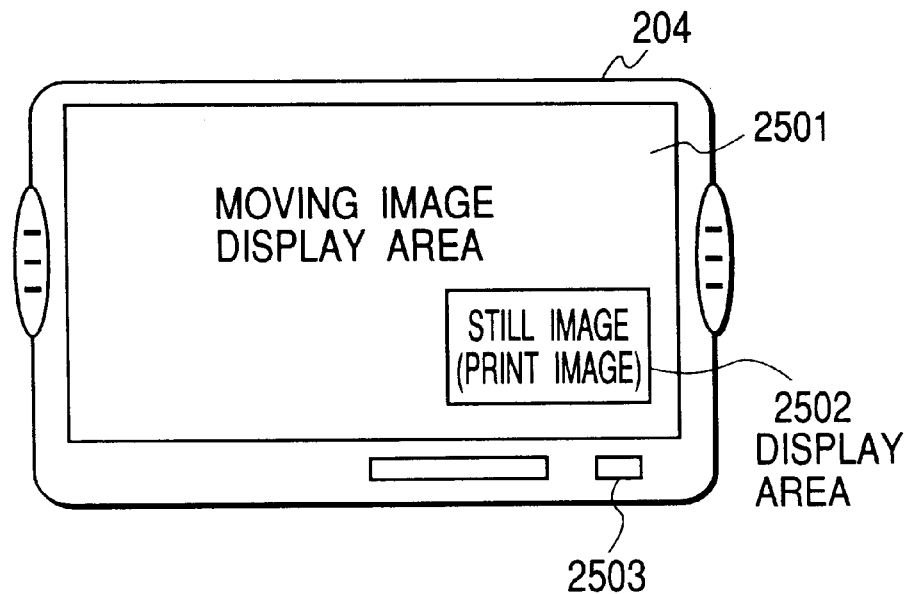
FIG. 25 is a diagram showing the structure of a monitor shown in the second embodiment.

FIG. 25 is a diagram showing an example of a display screen of the monitor 204. In FIG. 25, reference numeral 2501 represents a moving image display area for displaying moving images, reference numeral 2502 represents a still image display area for displaying a still image when necessary, and reference numeral 2503 represents an operation switch for instructing to display a desired still image contained in the displayed moving image.

The selector 67 of the monitor 204 selects either the moving or still image received via the 1394 interface 61 and supplies the selected image to the succeeding stage. The moving image data selectively output from the selector 67 is supplied to the expansion decoding unit 62 whereat the moving image data is expansion decoded and then supplied to the adder 68. On the other hand, a plurality frame of still image data selectively output from the selector 67 is directly supplied to the adder 68, because the non-compression encoded still image data is not necessary to be expansion decoded. The adder 68 adds the still image data to the moving image to synthesize them to display the still image in the still image display area in the moving image display area. An output of the adder 68 is supplied to the D/A converter 63 to display both the moving and still images on CRT 64 of the monitor 204.

With the structure constructed as above, a user can view both the moving and still images on the monitor 204. The user can therefore confirm the still image to be printed, on the monitor 204 together with the associated moving image.

Similar to the first embodiment, the printer 202 of the second embodiment is configured to be able to receive and print a non-compression encoded still image data. Therefore, even if a printer cannot deal with the encoding method used by the digital VTR integrated with a camera 201, a high quality image can be printed with a simple system configuration.

As described above, according to the second embodiment of the invention, if a source node apparatus uses an encoding method corresponding to the decoding method at an object node apparatus, the source node can transmit image information encoded by this encoding method. If the source node apparatus is not provided with an encoding method corresponding to the decoding method at an object node apparatus, the source node can transmit decoded image information. In this manner, the use efficiency of a communication transmission path can be improved.

The digital VTR integrated with a camera 201 of the second embodiment can broadcast in real time compression encoded or non-compression encoded moving images in accordance with the decoding performance of an object node. Similarly, a plurality frame of compression encoded or non-compression encoded still images can be sequentially broadcast, in accordance with the decoding performance of the object node. Accordingly, the same still image can be transmitted generally at the same time to a plurality of apparatuses.

The communication system of the second embodiment can not only select a still image contained in moving images without using an editing apparatus such as PC, but also print the still image with ease and quickly, without imparting unnecessary load on other apparatuses.

3. Third Embodiment

In the first and second embodiments, if a source node apparatus uses an encoding method corresponding to the decoding method at an object node apparatus, image information (including moving and still images) encoded by this encoding method is transmitted either by the isochronous or asynchronous transmission.

In the third embodiment, a source node apparatus transmits in advance decode program information realizing the decoding method corresponding to the encoding method of the source node apparatus, to an object node apparatus. In accordance with the decode program information, the object node apparatus decodes the image information asynchronously transmitted from the source node apparatus. A communication system realizing this will be described.

In the third embodiment, the processing units having similar operations and functions to those of the first and second embodiments are represented by using identical reference numerals, and the description thereof is omitted.

Figure 26:
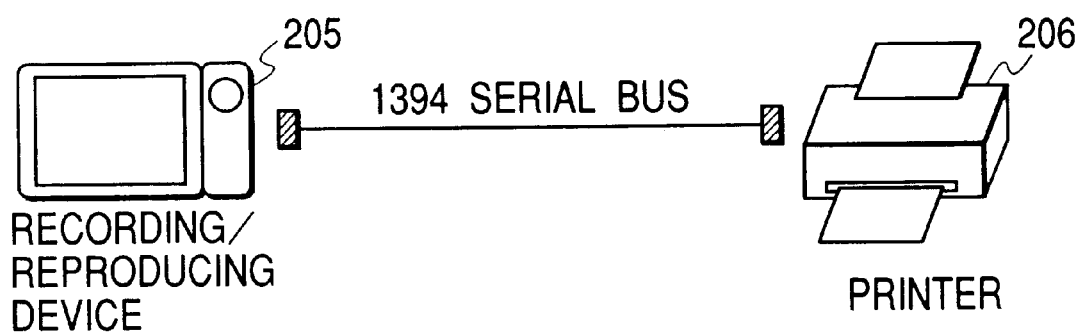
FIG. 26 is a schematic diagram showing the structure of a communication system according to third and fourth embodiments of the invention.
Figure 27:
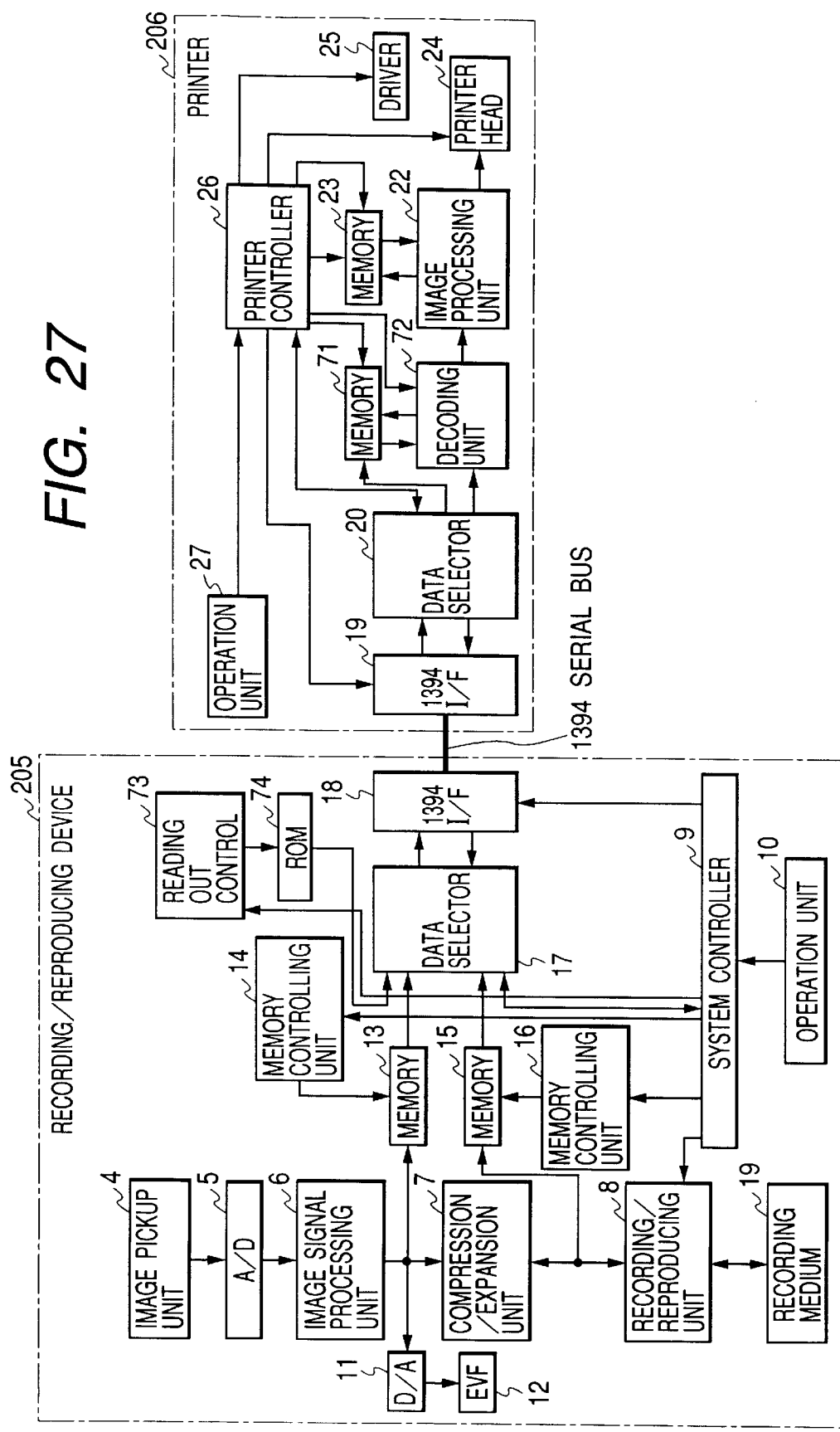
FIG. 27 is a diagram showing the details of a recording/reproducing device and a printer shown in the third and fourth embodiments.

With reference to FIGS. 26 and 27, the structure of a communication system of the third embodiment will be described.

FIG. 26 is a schematic diagram showing the structure of the communication system of the third embodiment. Referring to FIG. 26, a recording/reproducing device (e.g., digital VTR integrated with a camera) 205 and a printer 206 are directly connected by an 1394 interface. Namely, the apparatuses are connected in peer-to-peer. In this communication system, the printer 206 prints image data (still image) transmitted from the recording/reproducing device 205. The recording/reproducing device 205 and printer 206 have partially the same structures as those of the first embodiment.

FIG. 27 is a block diagram showing the detailed structures of the recording/reproducing device 205 and printer 206 of the third embodiment. With reference to FIG. 27, the structures of the recording/reproducing device 205 and printer 206 of the third embodiment different from the first embodiment will be described.

In the recording/reproducing device 205 shown in FIG. 27, a ROM 74 stores program codes realizing an expansion decoding method (e.g., MPEG, JPEG, DV (digital video), and the like) corresponding to a compression encoding method used by the compression encoding unit 7. A read control unit 73 operates to read the decode program information constituted of program codes when necessary, and to transmit it via the data selector 17, 1394 interface 18 to an external apparatus.

The decode program information is transmitted by the asynchronous transmission, or in some case, by the isochronous transmission. The transmission timing is set to a time before image data is transferred, or may be in one communication cycle together with image data transmission.

Although the recording/reproducing device 205 of the third embodiment uses an integrated one compression encoding method for all image data to be stored, another method may be used. For example, a plurality of compression encoding methods may be selectively used in the unit of an optional data amount or an optional time. In this case, ROM 74 stores decode program information corresponding to a plurality of decoding methods. The recording/reproducing device 205 transmits the decode program information to object node apparatuses in a predetermined order.

In order to decode image data, the printer 206 receives decode program information transmitted before the image data or in parallel with the image data, and stores it in an entirely or partially rewritable memory 71. The received compression encoded data is decoded by the decoding unit 72 by using the decode program information stored in the memory 71.

The memory 71 can store decode program information corresponding to an apparatus from which compression encoded data is transmitted. The decoding unit 72 can function as a plurality type of decoders, by using the memory 71. The decoding unit 72 may be structured so that it cannot operate as a decoder unless it receive decode program information from another apparatus, or a predetermined decode program may be stored in a partial area of the memory 71.

Compatibility of the transmitted/received decode program information is required between the recording/reproducing device 205 and printer 206. To this end, the decoding unit 72 is previously standardized and ROM 74 stores the decode program information written in accordance with the standards. Alternatively, only a method of writing the decode program information may be standardized, and the decoding unit 72 analyzes and executes the standardized decode program information.

With the structure constructed as above, compression encoded image data can be transmitted even if it does not match the decoding performance of the printer 206, and therefore a transmission efficiency thereof is better than that of non-compression encoded data.

In the third embodiment, time bomb data may be added to the decode program information transmitted to the printer 206 in order to automatically erase the decode program information after the print operation of a designated circuit is completed or after a predetermined time lapse. Such a function may be provided to the printer 206 itself, e.g., the printer controller 26. Furthermore, command data for erasing the decode program information may be transmitted from the recording/reproducing device 205, upon reception of a completion notice of the print operation.

Figure 28:
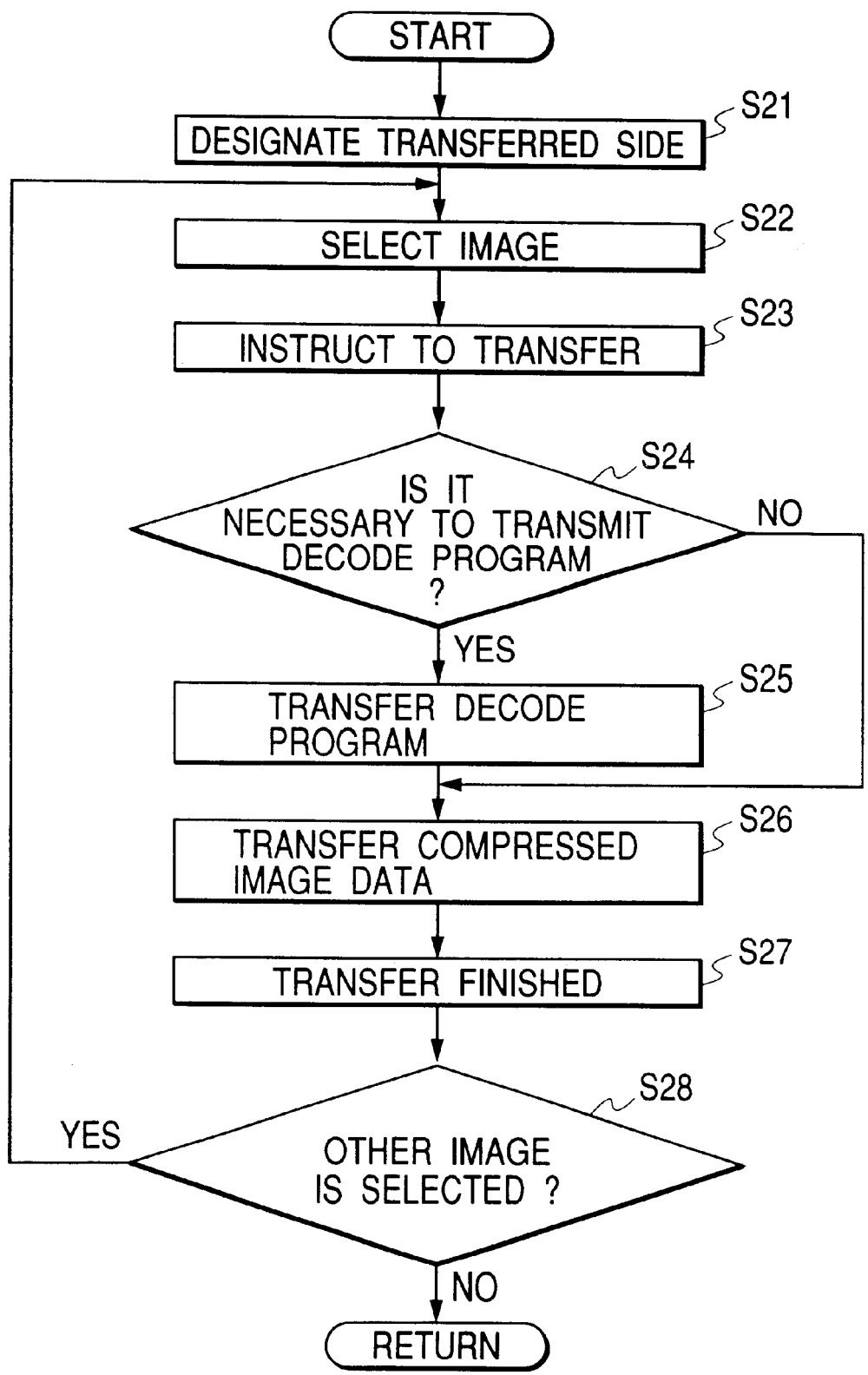
FIG. 28 is a flow chart illustrating the exemplary operation of the recording/reproducing device shown in the third embodiment.

FIG. 28 is a flow chart illustrating the operation of the recording/reproducing device 205 according to the third embodiment.

First, at Step S21 a user designates an object node apparatus. In this embodiment, the printer 206 is designated. In response to this designation, transmission setting is performed.

Next, the user selects image data (still image) to be printed, from the images stored in the recording medium. At Step S22, the recording/reproducing device 205 reads the selected image. After this selected image read operation, at Step S23 the user is urged to issue a transmission instruction for the desired image.

It is judged at Step S24 whether decode program information necessary for decoding the image data given the transmission instruction is required to be transmitted to an object node apparatus (in this case, printer 206). If required, i.e., if it is judged that the decoding unit 72 of the printer 206 can decode compression encoded image data by using the decode program information, then at Step S25 necessary decode program information is read from ROM 74 and transmitted to the printer 206.

The printer 206 stores the received decode program information in the memory 71.

If it is judged at Step S24 that transmission is not necessary, i.e., if the object node printer 206 has already necessary decode program information or if the necessary decode program transmitted in the past is being stored in the memory 71, then the decode program information is not transmitted and the image data starts being transmitted.

The information used for judging whether decode program information is required to be transmitted to the printer 206 can be acquired by returning from the printer 202, in response to a request from the recording/reproducing device 205, information of the decode program information possessed by the printer 202.

Next, at Step S26 the compression encoded image data given the transmission instruction is read from the recording medium 19, output to the memory 15 and transmitted to the printer 206.

Upon reception of the compression encoded data, the printer decodes it in accordance with the already stored decode program information to start the printing operation of the image data. If the decode program information is not still transmitted, the encode data starts being decoded after the transmission completion.

At Step S27, after the desired image data is transmitted, a predetermined process necessary for the transmission completion is performed. It is checked at Step S28 whether other image data is to be transmitted. If other image data is selected, the processes at Step S22 and following Steps are repeated. If other image data is not selected, the flow is terminated. This flow starts from Step S21 at any time in response to a transmission request for image data.

In the third embodiment, although compression encoded image information transmitted from the recording/reproducing device 205 to the printer 206 is a still image, the invention is not limited only thereto. For example, if the recording/reproducing device 205 is connected to a display unit such as a monitor 203, 204, compression encoded moving images may be transmitted. In this case, the display unit is required to have components similar to the memory 71 and decoding unit 72 of the printer 206.

In the third embodiment, although the transmission method for a still image is the asynchronous transmission similar to the first embodiment, the isochronous transmission may be used similar to the second embodiment. The latter case is convenient if a plurality of still images are sequentially transmitted or the same moving image is transmitted to a plurality of apparatuses.

As above, according to the third embodiment, a source node apparatus transmits in advance decode program information realizing a decoding method corresponding to the encoding method to be used by the source node apparatus, to an object node apparatus. Accordingly, image information (including moving and still images) to be transmitted to and from each apparatus is always compression encoded image data so that the use efficiency of a communication transmission path can be improved. Furthermore, the capacity of a memory for storing received image information can be reduced.

Irrespective of the type of a decoding method at an object node, the recording/reproducing device 205 of the third embodiment can transmit compression encoded still image data only to a designated object node apparatus, when necessary. Furthermore, the same still image can be transmitted generally at the same time to a plurality of apparatuses.

The communication system of the third embodiment can print a selected still image with ease and rapidly without using an editing apparatus such as PC.

4. Fourth Embodiment

In the third embodiment, an object node apparatus matches decode program information to be transmitted from a source node apparatus.

In the fourth embodiment, in accordance with the decoding performance at an object node apparatus, a source node apparatus transmits encoded image information, non-encoded image information, or encoded image information and decode program information. This case of the fourth embodiment will be described hereinunder.

In the fourth embodiment, the processing units having similar operations and functions to those of the first to third embodiments are represented by using identical reference numerals, and the description thereof is omitted.

With reference to FIGS. 26 and 27, the structure of a communication system of the fourth embodiment will be described.

Referring to FIG. 26, the recording/reproducing device 205 requests the printer 206 for the decoding performance (hereinafter called decode information) of the printer 206. If it is judged from the decode information that the memory 71 is storing decode program information corresponding to the encoding method to be used by the recording/reproducing device 205, then the system controller 9 controls the memory controller 16 to read desired image information (compression encoded moving or still image) from the memory 15. The image information read from the memory is transmitted by the isochronous transmission if it is a moving image, or by the asynchronous transmission if it is a still image.

If it is judged from the decode information that although a decoding process using the decode program information is possible, the memory 71 does not store decode program information corresponding to the encoding method to be used by the recording/reproducing device 205, then the system controller 9 controls the read control unit 73 to asynchronously transmit the decode program information stored in the memory 74. Thereafter, the system controller 9 controls the memory controller 16 to read desired image information (compression encoded moving or still image) from the memory 15. The image information read from the memory is transmitted by the isochronous transmission if it is a moving image, or by the asynchronous transmission if it is a still image.

If it is judged from the decode information that a decoding process corresponding to the encoding method to be used by the recording/reproducing device 205 is not possible and that a decoding process using the decode program information is not serviceable, then the system controller 9 controls the memory controller 14 to read desired image information (compression encoded moving or still image) from the memory 13. The image information read from the memory 14 is transmitted by the isochronous transmission if it is a moving image, or by the asynchronous transmission if it is a still image.

With the structure constructed as above, the recording/reproducing device 205 can transmit compression encoded image information as much as possible so that the transmission efficiency is better than that of non-compression encoded image information. It is also convenient since non-compression encoded image information can be transmitted even if compression encoded image information cannot be transmitted.

Figure 29:
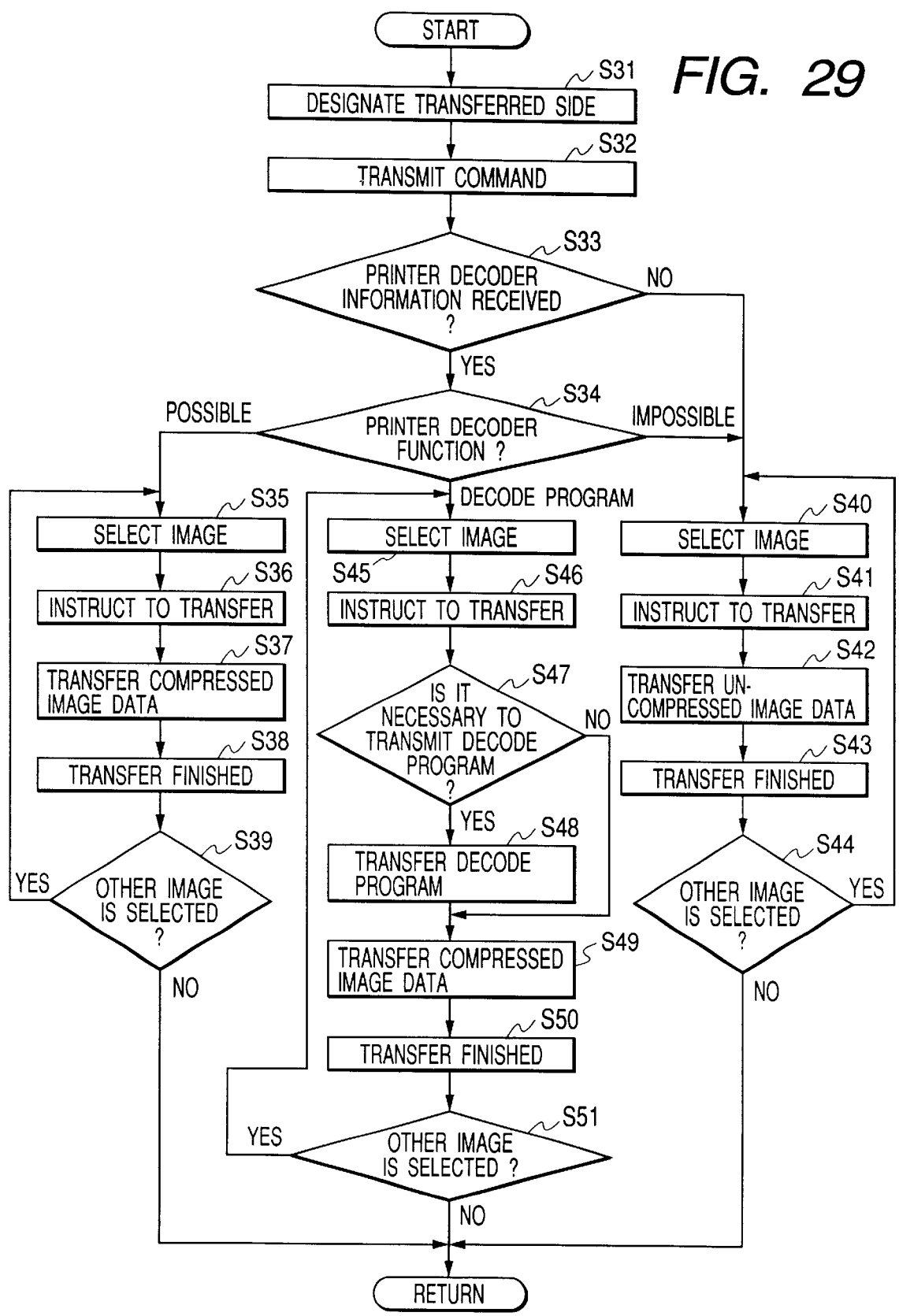
FIG. 29 is a flow chart illustrating the exemplary operation of the recording/reproducing device shown in the fourth embodiment.

FIG. 29 is a flow chart illustrating the operation of the recording/reproducing device 205 of the fourth embodiment.

At Step S31, as a user designates an object node apparatus (e.g., printer 206), and the recording/reproducing device 205 performs transmission setting corresponding to the designation. At Step S32 the recording/reproducing device 205 asynchronously transmits a command requesting decoder information (information of a presence/absence, type, configuration and the like of the decoder of the printer 205), by using the 1394 bus. Upon reception of the command issued at Step S32, the printer 206 asynchronously transmits predetermined transmission confirmation command data including decoder information to the recording/reproducing device 205.

At Step S33 the system controller 9 of the recording/reproducing device 205 judges whether the decoder information has been received. If received, the flow advances to Step S34.

If the printer 206 has no decoder function or it cannot transmit decoder information, if the command including decode information is not returned, or if the command is not received even after a predetermined time lapse because of transmission error on the bus or asynchronous transmission delay, then the recording/reproducing device 205 executes Step S40 in order to transmit only non-compression encoded data.

Next, at Step S34 the encoding performance of the printer 206 is checked from the decoder information. If it is judged that the printer 206 can deal with all encoding methods to be used by the recording/reproducing device 205, Step S35 is executed. If it is judged that compression encoded data can be decoded if predetermined decode program information is transmitted, Step S45 is executed. If compression encoded data cannot be decoded because the printer 206 cannot process the decode program information, cannot deal with the encoding method to be used by the recording/reproducing device 205, or has no decoding means, or because of other reasons, then Step S40 is executed.

The decode information transmitted from the printer 206 to the recording/reproducing device 205 is used for selecting either a mode of transmitting compression encoded image data itself, a mode of transmitting non-compression encoded image data, or a mode of transmitting compression encoded image data together with the decode program information. The decode information has a roll of judging which transmission mode the printer 206 requests. If predetermined information is previously notified between nodes, the decode information in the Step 32 can be used as a command for requesting compression encoded data transmission, non-compression encoded data transmission, or decode program information transmission.

If the decoding unit 72 of the printer 206 can deal with any compression encoding method to be used by the recording/reproducing device 205, Step S35 and following Steps are executed.

At Step S35 a user selects desired image data (still image) from the moving image stored in the recording medium 19, and the recording/reproducing device 205 performs a read operation for the selected image data. At Step S36 the user instructs to transmit the selected image. At Step S37, in order to transmit the designated image data in the form of compression encoded image data, the designated image data is reproduced from the recording medium 19 and asynchronously transmitted to the printer 206 via the frame memory 15. In accordance with a predetermined operation sequence, the printer 206 decodes the image data and starts the print operation.

When the desired image data is transmitted at Step S38, it is judged at Step S39 whether other image data is to be transmitted. If to be transmitted, Step S35 and following Steps are repeated, whereas if not to be transmitted, the flow terminates.

If the image data cannot be decoded because of the configuration of the printer 206 or the like, non-compression encoded data is always transmitted. In this case, the recording/reproducing device 205 performs Step S40 and following Steps.

At Step S40 a user selects desired image data (still image) from the moving image stored in the recording medium 19, and the recording/reproducing device 205 performs a read operation of the selected image data. At Step S41 the user instructs to transmit the selected image. At Step S42, the designated image data is converted into non-compression encoded data by the compression/expansion unit 7 and asynchronously transmitted to the printer 206 via the frame memory 13. In accordance with a predetermined operation sequence, the printer 206 decodes the image data and starts the print operation.

When the desired image data is transmitted at Step S43, it is judged at Step S44 whether other image data is to be transmitted. If to be transmitted, Step S40 and following Steps are repeated, whereas if not to be transmitted, the flow terminates.

If the decoding unit 72 of the printer 206 can decode compression encoded data by using predetermined decode program information, Step S45 and following Steps are executed in order to transmit the decode program information and compression encoded data.

At Step S45 a user selects desired image data (still image) from the moving image stored in the recording medium 19, and the recording/reproducing device 205 performs a read operation of the selected image data. At Step S46 the user instructs to transmit the selected image.

At Step S47 it is judged whether predetermined decode program information is to be transmitted to the object node printer 206 to decode the image data. If to be transmitted, at Step S48 necessary decode program information is read from ROM 47 and asynchronously (or isochronously) transmitted to the printer 206. The printer 206 stores the received decode program information in the memory 71. The decoding unit 72 performs a decoding process by using the memory 71.

If it is judged at Step S47 that it is not necessary to transmit the decode program information, because the printer 206 has already hardware or software decoding means or the necessary decode program information has already been stored in the memory 71, then the decode program information is not transmitted and the image data is transmitted.

At Step S49, the desired image data in the form of compression encoded data is read from the memory 16 and asynchronously transmitted to the printer 206. In accordance with a predetermined operation sequence, the printer 206 decodes the transmitted image data by using the transmitted decode program information and starts the print operation.

When the desired image data is transmitted at Step S50, it is judged at Step S51 whether other image data is to be transmitted. If to be transmitted, Step S45 and following Steps are repeated, whereas if not to be transmitted, the flow terminates.

After the process at Step S39, S44, or S51, in response to a request for image data transmission, the flow returns to Step S31 to repeat this flow.

In the fourth embodiment, although image information transmitted from the recording/reproducing device 205 to the printer 206 is a still image, the invention is not limited only thereto. For example, if the recording/reproducing device 205 is connected to a display unit such as a monitor 203, 204, compression encoded or non-compression encoded moving images may be transmitted. In this case, the display unit is required to have components similar to the memory 71 and decoding unit 72 of the printer 206. Furthermore, if a plurality frame of still images are to be sequentially transmitted, these still images may be isochronously transmitted.

As above, according to the fourth embodiment, a source node apparatus selects a suitable mode in accordance with the decoding performance of an object node apparatus, from a mode of transmitting encoded image information, a mode of transmitting non-encoded image information and a mode of transmitted encoded image information and decode program information. Accordingly, image information (including moving and still images) to be transmitted to and from each apparatus is compression encoded in accordance with the decoding performance of an object node apparatus so that the use efficiency of a communication transmission path can be improved. Furthermore, the capacity of a memory for storing compression encoded image information received at an object node apparatus, can be reduced.

The recording/reproducing device 205 of the fourth embodiment can transmit compression encoded still image data only to a designated object node apparatus, when necessary, in accordance with the decoding performance at an object node apparatus.

The communication system of the fourth embodiment can print compression encoded image information with ease and rapidly without using an editing apparatus such as PC, in accordance with the decoding performance of an object node apparatus.

5. Other Embodiments

The process sequence of each apparatus of the communication system of the first to fourth embodiments can be realized by software.

For example, the embodiments of the present invention may be realized, by configuring that a storage medium storing program codes of software realizing the functions of each embodiment is supplied to a controller (including a microcomputer) of the system or apparatus of each embodiment, or by configuring that a controller of the system or apparatus of each embodiment reads the program codes stored in the storage medium and controls the system or apparatus so as to realize the functions of each embodiment.

For example, the program codes realizing the processes and functions of the first and second embodiments shown in FIG. 19, the third embodiment shown in FIG. 28 and the fourth embodiment shown in FIG. 29 are stored in storage media of the system controller 9 shown in FIGS. 18, 22 and 27. The system controller 9 itself reads the program codes to operate each process unit of the recording/reproducing devices 201 and 205 shown in FIGS. 18, 22 and 27 to realize the functions of the embodiments.

In this case, the program codes themselves read from a storage medium realize the functions of the embodiments. Therefore, the storage medium storing the program codes constitutes the present invention.

The storage medium storing such program codes may be a floppy disk, a hard disk, an optical disk, a magneto-optical disk, a CD-ROM, a CD-R, a magnetic tape, a non-volatile memory card, and a ROM.

Obviously, the invention includes the case wherein the embodiment functions are realized by an OS (operating system), application software or the like which controls the system or apparatus of the embodiments in accordance with instructions of the program codes read from a storage medium.

Obviously, the invention includes the case wherein the embodiment functions are realized by writing the program codes read from a storage medium into a memory of an expansion board or unit connected to a controller which controls the operation of the system or apparatus of the embodiments in accordance with the program codes.

The invention may be embodied in other specific forms without departing from the spirit or essential characteristics thereof.

For example, in the above embodiments, although image information recorded in the recording medium 19 is encoded or non-encoded and transmitted, the invention is not limited thereto, but image information picked up with the image pickup unit 4 and generated by the image signal processing unit 6 may be encoded or non-encoded and transmitted.

In the above embodiments, a digital VTR integrated with a camera and dealing moving and still images is used as an example of the recording/reproducing device 201, 205. Other recording/reproducing devices may also be used which can record/reproduce digital data (e.g., audio data) such as moving images desired to the transmitted in real time and digital data (e.g., file data) such as still images not desired to be transmitted in real time. These devices may be storage devices, DVD (digital video disc) players, CD-ROM players and the like.

In the above embodiments, although the communication system is configured by using digital interfaces in conformity with IEEE 1394 specifications, the invention is not limited thereto. For example, communication interfaces using two communication transmissions corresponding to isochronous and asynchronous transmissions may be used.

Therefore, the above-mentioned embodiments are merely examples in all respects, and must not be construed to limit the invention.

The scope of the present invention is defined by the scope of the appended claims, and is not limited at all by the specific descriptions of the specification. Furthermore, all the modifications and changes belonging to equivalents of the claims are considered to fall within the scope of the present invention.

What is claimed is:

1. A transmission apparatus for transmitting compressed still image data that is compressed and encoded by an encoding method or non-compressed still image data that is not compressed and encoded by the encoding method to a printer, said transmission apparatus comprising:

a detection unit adapted to detect whether or not the printer has a function for decoding the compressed still image data; and a communication unit adapted to transmit the compressed still image data to the printer, if the printer has the function, and to transmit the non-compressed still image data to the printer, if the printer does not have the function.

2. A transmission apparatus according to claim 1, further comprising a decoding unit adapted to decode the compressed still image data to generate the non-compressed still image data, if the printer does not have the function.

3. A transmission apparatus according to claim 1, wherein said communication unit transmits the compressed still image data or the non-compressed still image data to the printer via a serial interface.

4. A transmission apparatus according to claim 1, wherein said communication unit transmits the compressed still image data or the non-compressed still image data to the printer via an asynchronous transmission mode that conforms to IEEE 1394 specifications.

5. A transmission apparatus according to claim 1, wherein said transmission apparatus is a digital device that includes a camera unit.

6. A transmission apparatus according to claim 5, wherein said transmission apparatus is a digital device that includes a recorder unit adapted to record moving image data or still image data on a recording medium.

7. A transmission method of transmitting compressed still image data that is compressed and encoded by an encoding method or non-compressed still image data that is not compressed and encoded by the encoding method to a printer, said method comprising:

a detection step, of detecting whether or not the printer has a function for decoding the compressed still image data; and a transmission step, of transmitting the compressed still image data to the printer, if the printer has the function, and transmitting the non-compressed still image data to the printer, if the printer does not have the function.

8. A transmission method according to claim 7, further comprising a decoding step, of decoding the compressed still image data to generate the non-compressed still image data, if the printer does not have the function.

9. A transmission method according to claim 7, wherein said transmission step includes transmitting the compressed still image data or the non-compressed still image data to the printer via a serial interface.

10. A transmission method according to claim 7, wherein said transmission step includes transmitting the compressed still image data or the non-compressed still image data to the printer in an asynchronous transmission mode that conforms to IEEE 1394 specifications.

11. A transmission method according to claim 7, wherein said transmission method is applicable to a digital device that includes a camera unit.

12. A transmission method according to claim 11, wherein said transmission method is applicable to a digital device that includes a recorder unit adapted to record moving image data or still image data on a recording medium.

* * * * *

UNITED STATES PATENT AND TRADEMARK OFFICE
CERTIFICATE OF CORRECTION

PATENT NO.     : 6,453,071 B2
DATED          : September 17, 2002
INVENTOR(S)    : Masamichi Ito et al.

It is certified that error appears in the above-identified patent and that said Letters Patent is hereby corrected as shown below:

<u>Title page,</u>
Item [*], Notice, insert -- [*] Notice: This patent issued on a continued prosecution application filed under 37 CFR 1.53(d), and is subject to the twenty year patent term provisions of 35 U.S.C. 154(a)(2). --.

Signed and Sealed this

Third Day of June, 2003

JAMES E. ROGAN
*Director of the United States Patent and Trademark Office*